United States Patent [19]
Kawamura et al.

[11] Patent Number: 5,231,324
[45] Date of Patent: Jul. 27, 1993

[54] THREE-PHASE ARMATURE WINDING

[75] Inventors: Tsutomu Kawamura, Yokkaichi; Nobuo Takechi, Mie, both of Japan

[73] Assignee: Kabushiki Kaisha Toshiba, Kanagawa, Japan

[21] Appl. No.: 733,217

[22] Filed: Jul. 19, 1991

[30] Foreign Application Priority Data

Jul. 19, 1990 [JP] Japan ................................ 2-76104[U]
Oct. 17, 1990 [JP] Japan ................................ 2-278200

[51] Int. Cl.⁵ .............................................. H02K 1/00
[52] U.S. Cl. ..................................... 310/198; 310/184
[58] Field of Search ............... 310/179, 254, 180, 261, 310/184, 198, 206, 207, 214, 208, 195

[56] References Cited

U.S. PATENT DOCUMENTS

| | | | |
|---|---|---|---|
| 3,161,814 | 12/1964 | Williams | 310/184 UX |
| 3,396,324 | 8/1968 | Karlsson | 310/184 UX |
| 3,515,922 | 6/1970 | Fong | 310/198 |
| 3,821,573 | 6/1974 | Willyoung | 310/179 |
| 4,200,817 | 4/1980 | Bratoljic | 310/198 |
| 4,370,581 | 1/1983 | Nakamura | 310/198 |
| 4,394,596 | 7/1983 | Kimura | 310/184 |
| 4,500,806 | 2/1985 | Kanayama | 310/198 |
| 4,896,063 | 1/1990 | Roberts | 310/184 |
| 4,914,335 | 4/1990 | Horton | 310/207 |

FOREIGN PATENT DOCUMENTS 47-42881 10/1972 Japan.
48-24284 7/1973 Japan.
51-28125 8/1976 Japan.

Primary Examiner—R. Skudy
Attorney, Agent, or Firm—Limbach & Limbach

[57] ABSTRACT

In a three-phase armature winding of the concentrically wound double-layer type, coil ends of three-phase first pole windings are distributed on an outermost circumference and coil ends of second and other pole windings are distributed on inner circumferences in turn in a first arrangement. In a second arrangement, coil sides of three-phase first pole windings and second pole windings paired with the first pole windings in a three-phase six-pole arrangement are laid in adjacent slots in sequence. This coil arrangement is applied to paired fifth and fourth pole windings.

1 Claim, 40 Drawing Sheets

THREE-PHASE ARMATURE WINDING

BACKGROUND OF THE INVENTION

This invention relates to a three-phase slotted armature winding wherein coils are laid in stator core slots such that a winding in each pole of each phase has a concentric double-layer winding arrangement.

In the following description, a winding comprises a coil or a plurality of series coils laid in slots for forming each pole and each coil comprises a plurality of turns of an electrical wire. A winding forming a pole is referred to as a pole winding.

A lap winding and a concentric winding are known as coil arrangements in a three-phase armature winding. In the lap winding, coils having the same configuration and coil pitch are placed one upon the other in sequence and laid in the slots. Electric characteristics of each phase are advantageously balanced since the coils have the same configuration and the winding resistance and leakage reactance of each phase are equal. However, the coil inserting work cannot be automatized since the coils of different phases are placed one upon the other into double-layers and laid in one and the same slot, resulting in a disadvantage that the work needs to be manually performed by workers.

On the other hand, in the concentric winding, a plurality of coils different in the coil pitch in a winding of each pole of each phase are laid in the slots so that the coils are distributed so as to be concentric about the pole center. The coils can be laid in the slots by a coil inserting machine generally called automatic coil inserter and the inserter has been widely used for its superior productivity.

Japanese Published (kokoku) Patent Application No. 47-42881 discloses a double-layer lap type armature winding which has a coil arrangement wherein the automatic coil insertion can be performed at every one pole winding by the automatic coil inserter. In this case a coil transposing work is eliminated wherein a coil side of the initially laid winding is taken out of the slot when a final winding is laid in the slot, and coil sides of the final and initial windings are laid in the empty slot with the coil side of the initial winding placed on that of the final winding. However, in the case of the three-phase four-pole arrangement, for example, the coil inserting operation need to be performed at twelve times, which number corresponds to the number of poles.

Japanese Published (kokoku) Patent Application No. 48-24284 discloses an armature winding of the concentric double-layer type. The same number of times of the coil inserting operation as in the above-described armature winding is required in the case of the three-phase four-pole arrangement and additionally, the troublesome coil transposing work is also required.

Japanese Published (kokoku) Patent Application No. 51-28125 discloses an armature winding of the concentric single-layer type armature winding, in which the coil inserting operation need to be performed only at four times in the case of the three-phase four-pole arrangement but an amount of copper used is disadvantageously increased as will be described with reference to FIG. 44.

FIG. 44 illustrates a conventional three-phase four-pole armature winding of the concentric single-layer type. Coils are laid in the slots in the order of all poles of phase U, those of phase V and those of phase W at every phase. Accordingly, end windings are disposed in the order of the phases U, V and W inwardly from the outer circumferential side and the pole coils are positioned in four ranges of approximately 90 degrees respectively obtained by equally dividing an annular area surrounding the rotor. In FIG. 44, first to fourth poles are represented as U1 to U4 with respect to the coils of phase U, respectively and those poles of the phases V and W are represented as V1 to V4 and W1 to W4 in the same manner as described above with respect to the phases V and W, respectively. The arrangement shown in FIG. 44 results in the following problems:

First, since the armature winding is a single-layer winding wherein a single coil is laid in each slot, the coil insertability is reduced in the case of the type with a large coil volume and it becomes difficult to shape the end windings after the insertion. Consequently, the coil surface is damaged or an axial dimension of the coil needs to be increased for avoidance of difficulty in shaping. Accordingly, the thickness of each slot insulator or interphase insulator needs to be sufficiently increased so that the winding is durable sufficiently in the end winding shaping step.

Second, the dimension of the end winding differs from phase to phase since the end winding of each phase is arranged such that the different phases are radially arranged. Accordingly, since differences in the winding resistance and leakage reactance unbalance the winding impedances of the respective phases, resulting in various electrical deficiencies such as unbalance in the excitation current. Additionally, when the core dimensions are the same as in the lap winding type, the concentric type is inferior in various electrical characteristics to the lap type and an amount of copper used is larger.

SUMMARY OF THE INVENTION

Therefore, a primary object of the present invention is to provide a three-phase armature winding of the concentric double-layer type which can be improved in the commercial productivity with the coil insertion as easy as in the concentric single-layer type and can achieve the electrical characteristics as superior as in the double-layer lap type.

The three-phase armature winding in accordance with the present invention belongs to any one of the winding structures, the concentric double-layer type, double-layer lap type and concentric double-layer lap type, depending upon modes of reduction to practice. Further, the armature winding of the present invention has such a structure that the windings of the same poles in all the phases are simultaneously laid in the slots. This definition of the winding structure of the present invention results from the fact that among the coils constructing the pole windings of all phases, only those without coil sides laid in the same slots are simultaneously laid in the slots and the simultaneous inserting operation is performed with respect to a plurality of coils so that the winding arrangement of the concentric double-layer type is obtained.

Another object of the present invention is to provide a three-phase armature winding of the double-layer type wherein two coil sides are laid in each slot, the number of operations of laying the coils in the slots can be reduced and the length of the end windings can be prevented from being unbalanced among phases The structure of the three-phase armature winding in accordance with the present invention provides for the following nine arrangements:

First Arrangement

In a three-phase armature winding wherein each pole winding in each phase comprises q number of coils laid in armature core slots so that the armature winding is formed into a concentric double-layer arrangement, three first pole windings of the respective phases are dispersively arranged in first divided regions obtained by dividing all the slot region into three equally divided regions. Three second pole windings of the respective phases are dispersively arranged in second divided regions obtained by dividing all the slot region into three equally divided regions. The second divided regions follows the first divided regions. The first and second divided regions are circumferentially shifted from each other by an electrical angle of 60 degrees respectively. The number q is determined so that double-layer windings are sequentially formed upon the simultaneous laying of the second pole windings in the slots following the simultaneous laying of the first pole windings in the slots.

Second Arrangement

In a three-phase armature winding formed into an integral-slot winding, each pole winding in each phase comprises q number of coils having one and the same coil pitch and sequentially laid in adjacent slots where q is the number of slots in each pole in each phase. The phase windings are shifted from one another by an electrical angle of $p\pi/3$ where p is the number of poles. The number q is determined so that a double-layer lap winding is formed by simultaneously laying a set of the three-phase first pole windings in the slots at the number of times corresponding to the number of poles.

Third Arrangement

In a three-phase armature winding, each pole winding in each phase comprises q number of coils in series concentrically distributed where q is the number of slots in each pole in each phase. The number q is so set that 2q number of slots are provided between innermost coil sides. Each pole winding in each phase has a coil arrangement that one coil sides of q number of coils corresponding to each one pole of two of the three phases are laid in 2q number of slots provided between innermost coil sides of one pole winding in the other phase such that the coils are laid in all the slots so as to form a double-layer winding.

Fourth Arrangement

In a three-phase armature winding, each pole winding in each phase comprises q number of concentrically wound coils laid in armature core slots so that each pole winding in each phase has q number of slots between innermost coil sides where q is the number of slots in each pole winding in each phase. Each pole winding in each phase has a coil arrangement that both coils sides of one pole winding in one phase are laid in q number of slots positioned between both sides of q number of coil sides of a pole winding in a previous phase such that the coils are laid in all the slots so as to form a double-layer winding.

Fifth Arrangement

In a three-phase armature winding, each pole winding in each phase comprises q number of coils in series distributed so as to form a lap winding where q is the number of slots in each pole in each phase. The number q is so set that 2q number of slots are provided between innermost coil sides. Each pole winding in each phase has a coil arrangement that one coil sides of q number of coils corresponding to each one pole of two of the three phases are laid in 2q number of slots provided between innermost coil sides of one pole winding in the other phase such that the coils are laid in all the slots so as to form a double-layer winding.

Sixth Arrangement

In a three-phase six-pole armature winding, each pole winding in each phase comprises q number of coils in series where q is the number of slots in each pole in each phase. The coils in series have a minimum coil pitch of such a value that 2q number of slots are provided within the minimum coil pitch. The armature winding has a first coil arrangement in which one coil sides of each one pole winding in second and third phases are laid in the slots within the minimum coil pitch in first, second and three poles in a first phase shifted from one another by an electrical angle of 360 degrees and a second coil arrangement applied to fourth, fifth and sixth poles shifted from the first, second and third poles in the first phase by an electrical angle of 180 degrees respectively, the second coil arrangement being the same as the first coil arrangement, whereby a concentric double-layer winding is formed.

Seventh Arrangement

In a three-phase six-pole armature winding, each pole winding in each phase comprises q number of coils in series where q is the number of slots in each pole in each phase. The coils in series have a minimum coil pitch of such a value that less than 2q number of slots are provided within the minimum coil pitch. The armature winding has a first coil arrangement in which one coil sides of one pole winding in a phase following a first phase are laid in the slots within the minimum coil pitch in each of three poles in the first phase shifted from one another by an electrical angle of 360 degrees, the one coil sides of the one pole winding being shifted from one another by an electrical angle of 60 degrees, a second coil arrangement applied to a third phase and its subsequent phase, the second coil arrangement being the same as the first coil arrangement, and a third coil arrangement applied to a second phase and its subsequent phase, the third coil arrangement being the same as the first coil arrangement, the first, second and third coil arrangements being shifted from one another by an electrical angle of 120 degrees, whereby a concentric double-layer winding is formed.

Eighth Arrangement

In a three-phase six-pole armature winding, each pole winding in each phase comprises q number of coils in series having the same coil pitch where q is the number of slots in each pole in each phase. The coils in series have 2q number of slots between innermost coil sides. The armature winding has a first coil arrangement in which one coil sides of each one pole winding in second and third phases are laid in the slots within the minimum coil pitch in first, second and three poles in a first phase shifted from one another by an electrical angle of 360 degrees and a second coil arrangement applied to fourth, fifth and sixth poles shifted from the first, second and third poles in the first phase by an electrical angle of 180 degrees respectively, the second coil arrangement being the same as the first coil arrangement, whereby a double-layer lap winding is formed.

Ninth Arrangement

In a three-phase six pole armature winding, each pole winding in each phase comprises q number of coils in series having the same coil pitch where q is the number of slots in each pole in each phase. The coils in series have less than 2q number of slots between innermost coil sides. The armature winding has a first coil arrangement in which one coil sides of each pole winding in a phase following a first phase shifted from one another by an electrical angle of 60 degrees are laid in the slots between the inner most coil sides in three poles in a first phase shifted from one another by an electrical angle of 360 degrees, a second coil arrangement applied to a third phase and its subsequent phase, the second coil arrangement being the same as the first coil arrangement, and a third coil arrangement applied to a second phase and its subsequent phase, the third coil arrangement being the same as the first coil arrangement, whereby a double-layer lap winding is formed.

Other objects of the present invention will become obvious upon an understanding of the illustrative embodiment about to be described with reference to the accompanying drawings. Various advantages not referred to herein will occur to one skilled in the art upon employment of the invention in practice.

DESCRIPTION OF THE PREFERRED EMBODIMENTS

Figure 11:
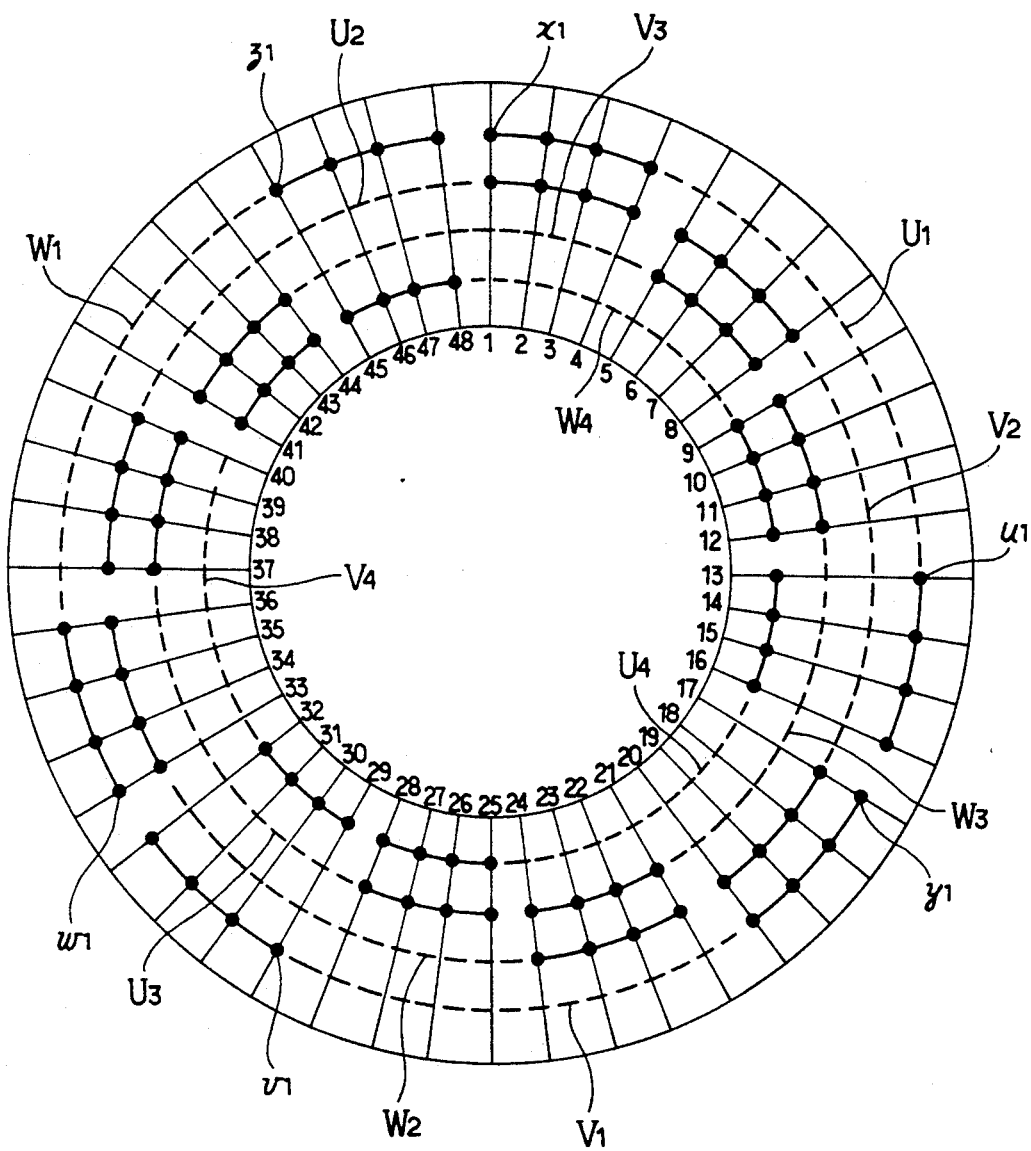
Figure 12:
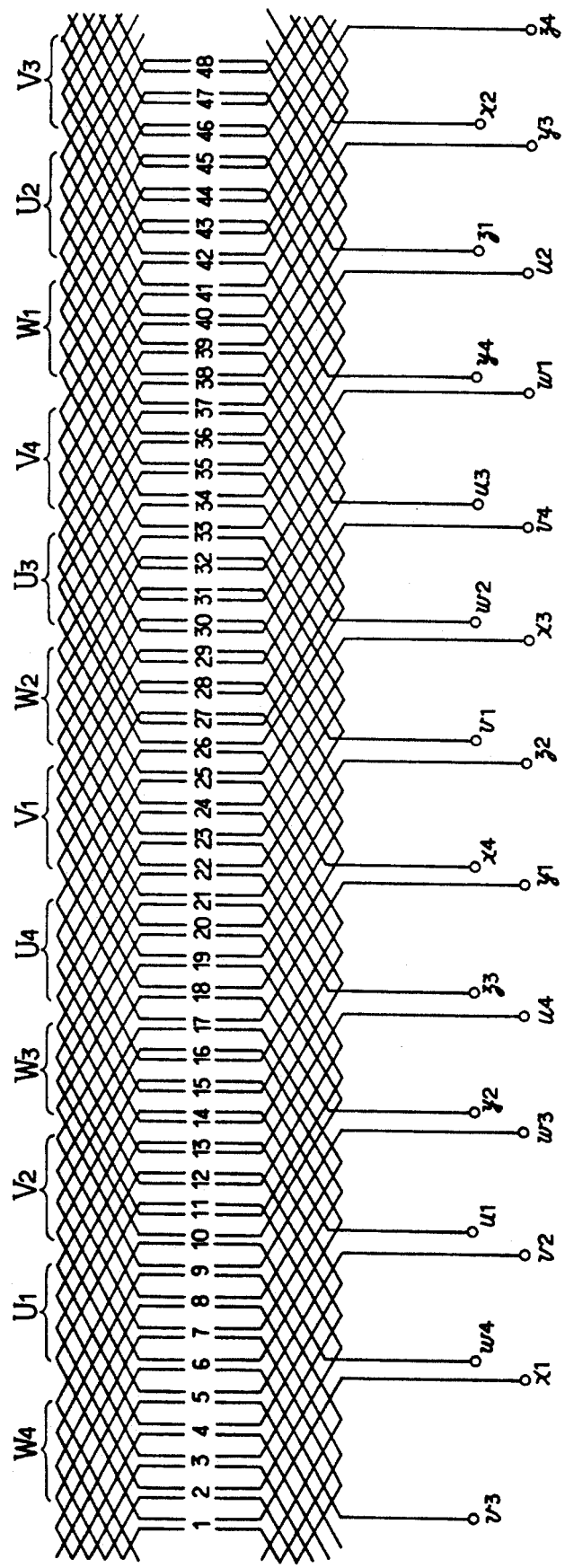
FIGS. 12 and 13 are views similar to FIGS. 5 and 7 illustrating a fifth embodiment respectively.
Figure 13:
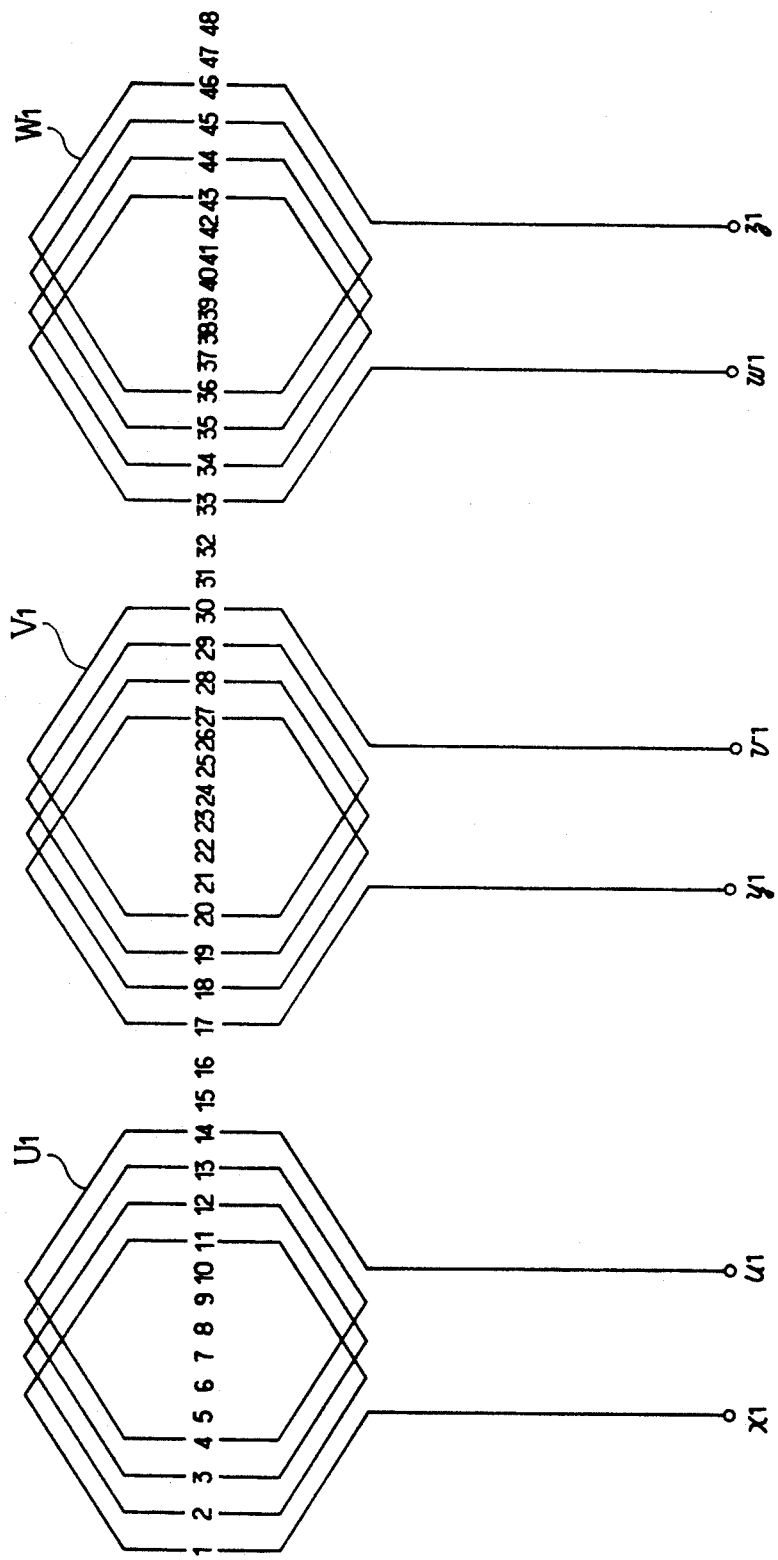
Figure 23:
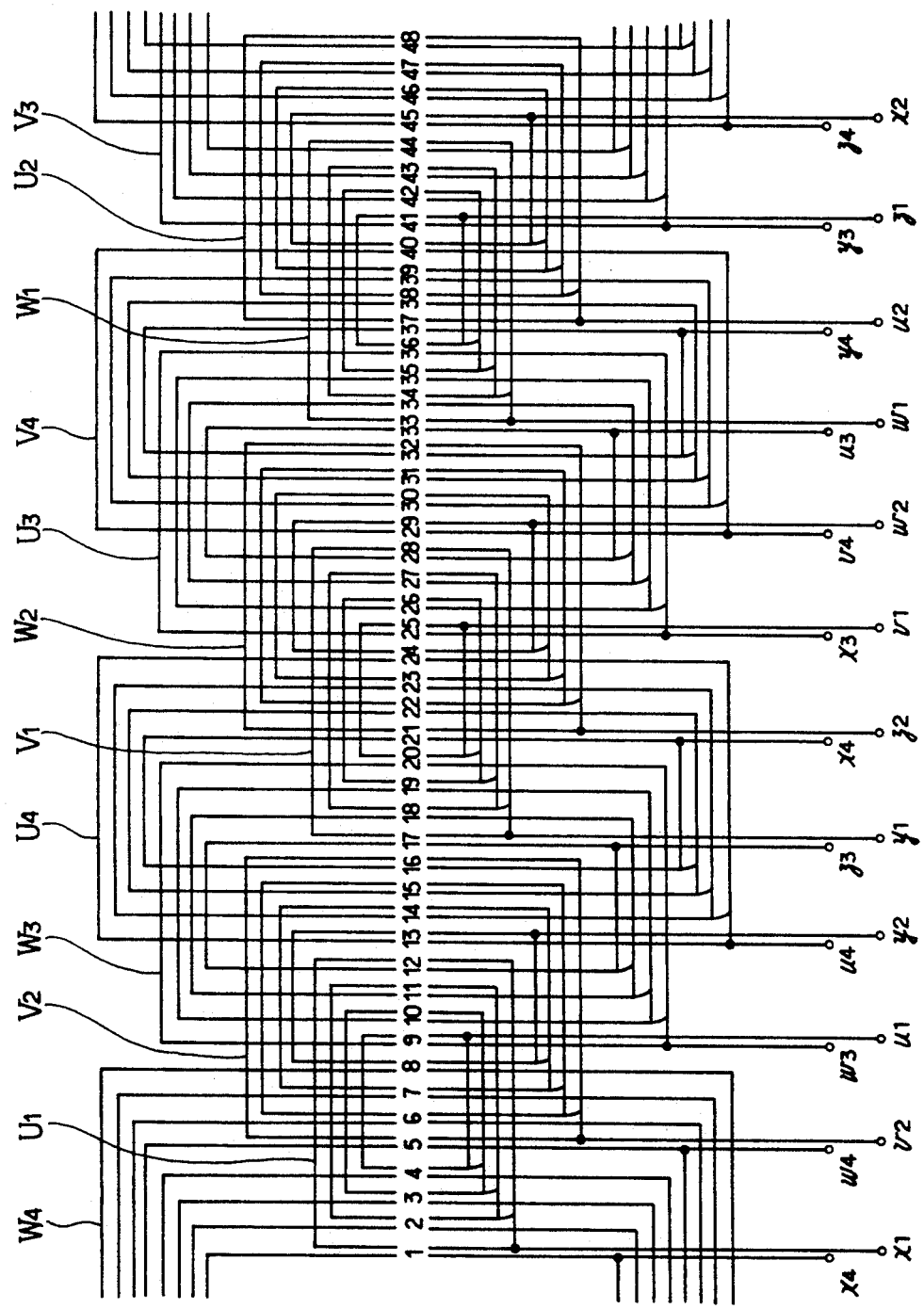
FIGS. 23 and 24 are views similar to FIGS. 5 and 6 illustrating a twelfth embodiment respectively.
Figure 24:
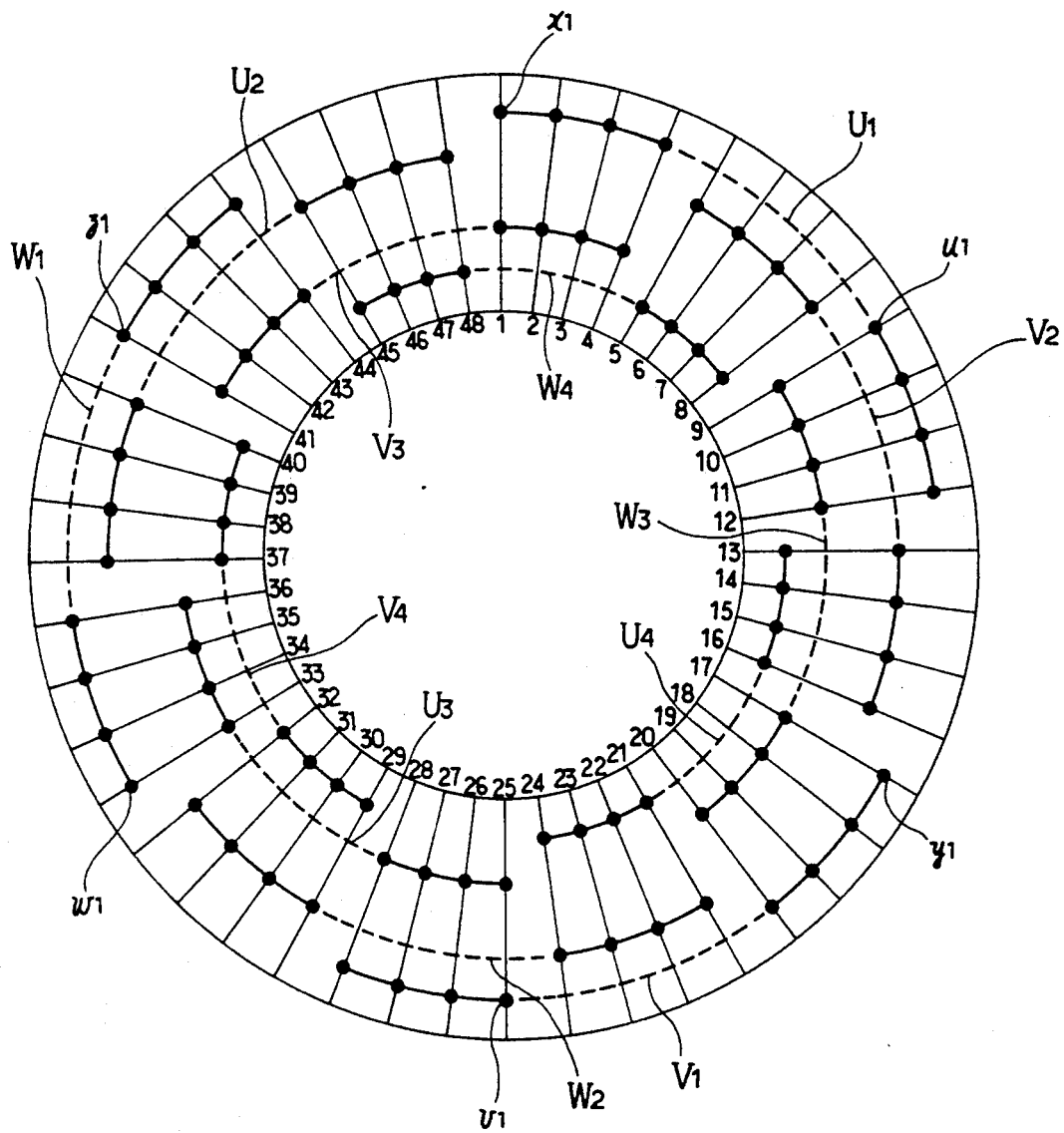
Figure 25:
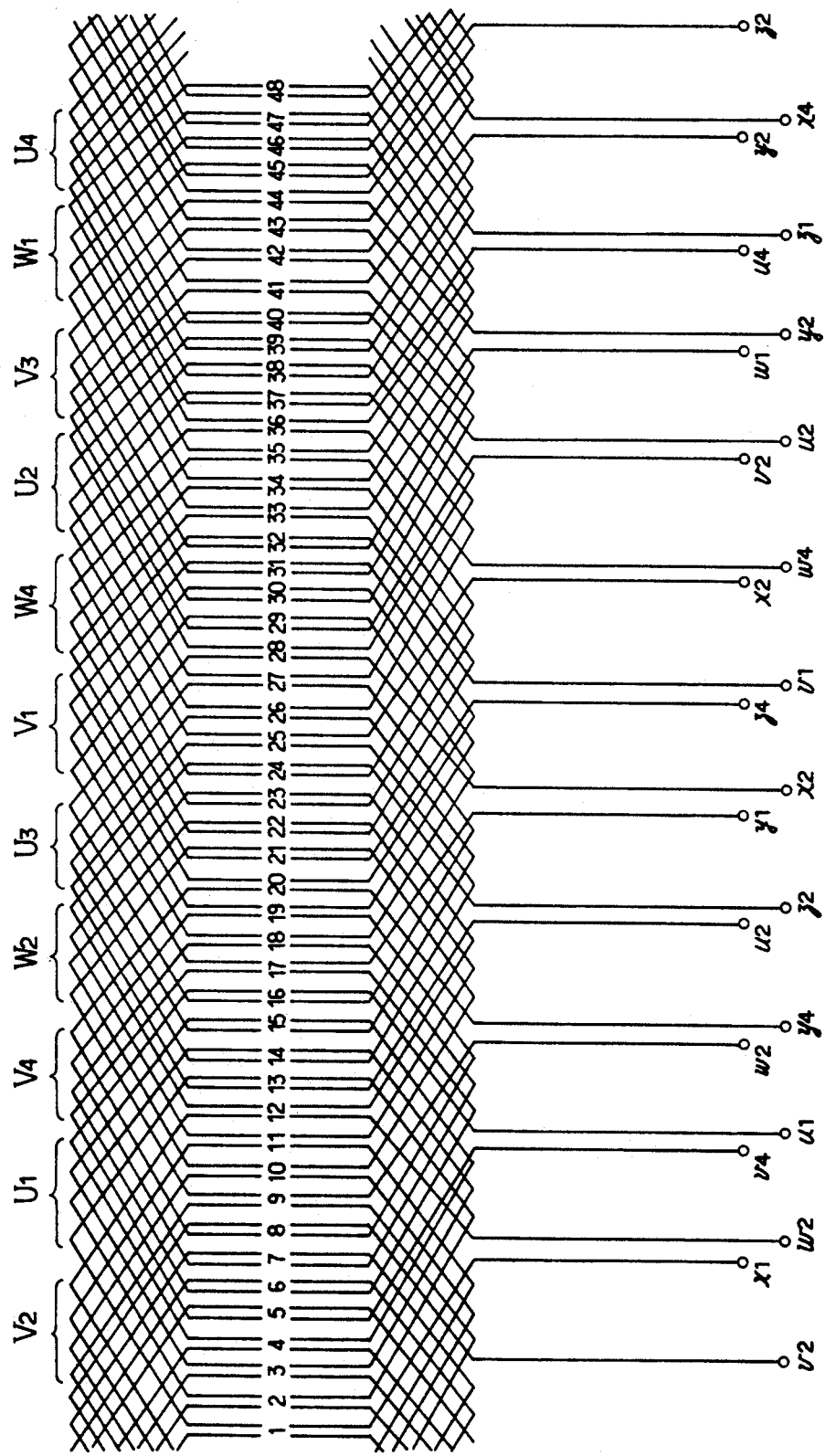
FIGS. 25 and 26 are views similar to FIGS. 12 and 13 illustrating a thirteenth embodiment respectively.
Figure 26:
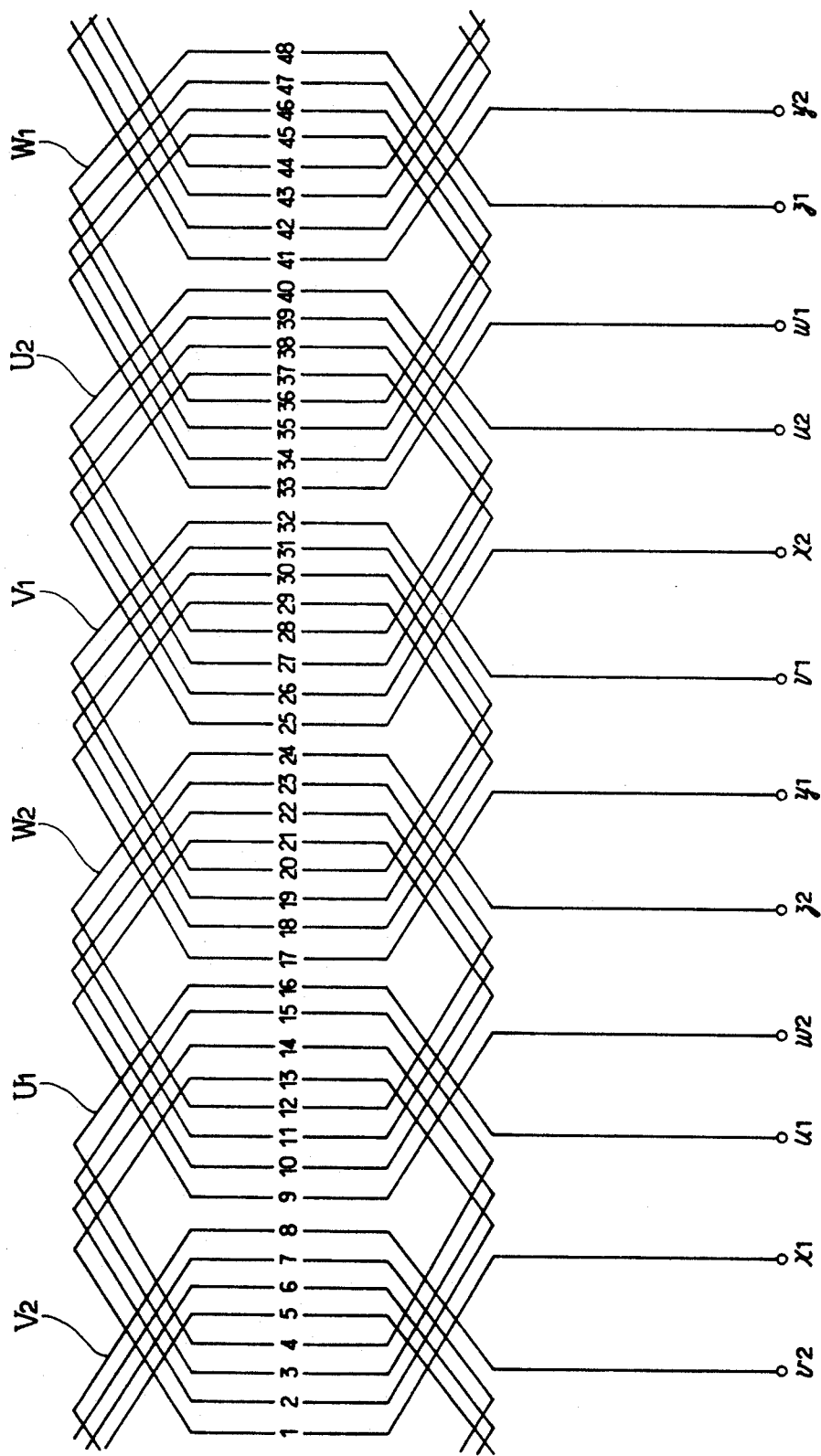
Figure 27:
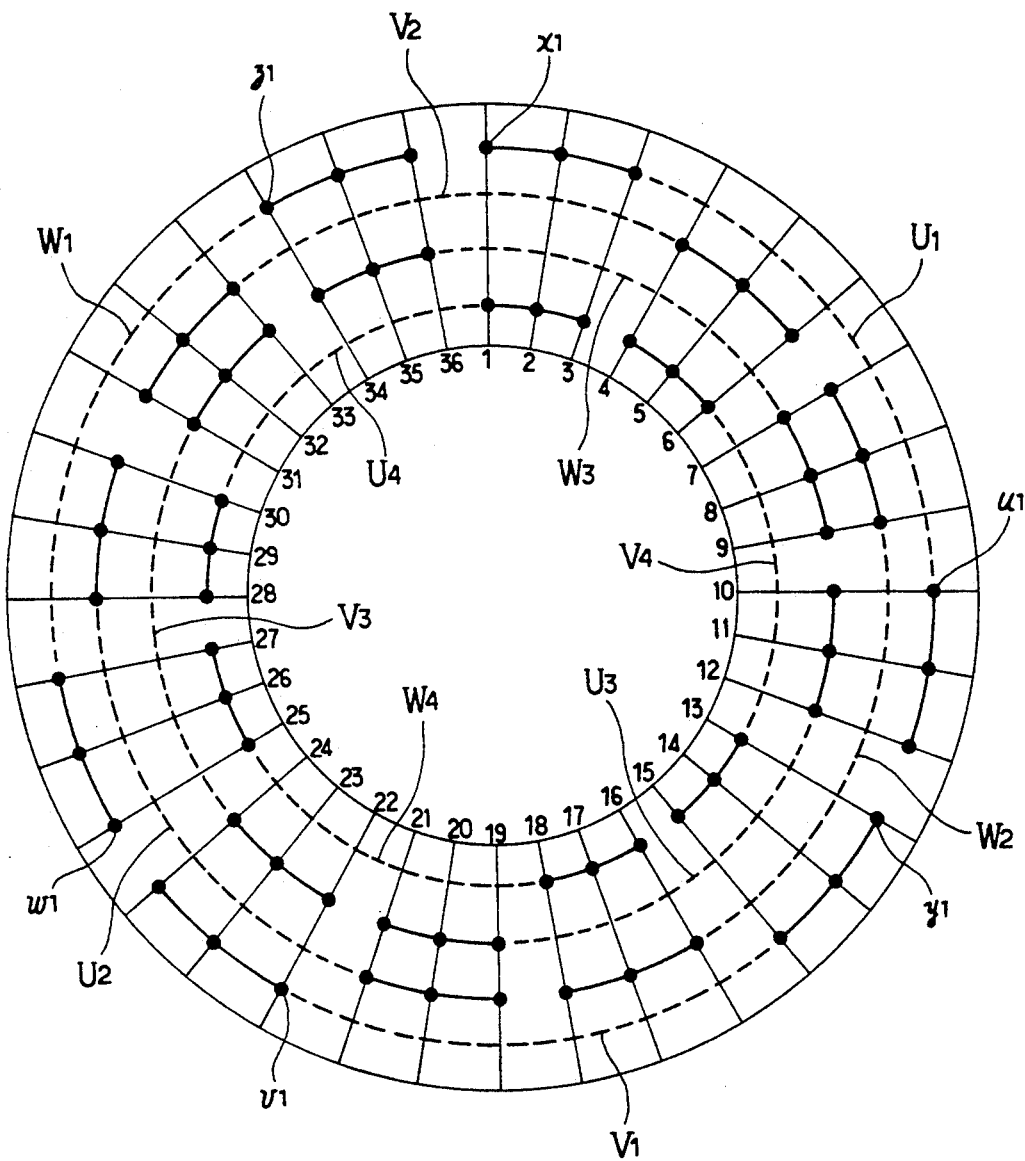
FIG. 27 is a view similar to FIG. 6 illustrating fourteenth and fifteenth embodiments.
Figure 28:
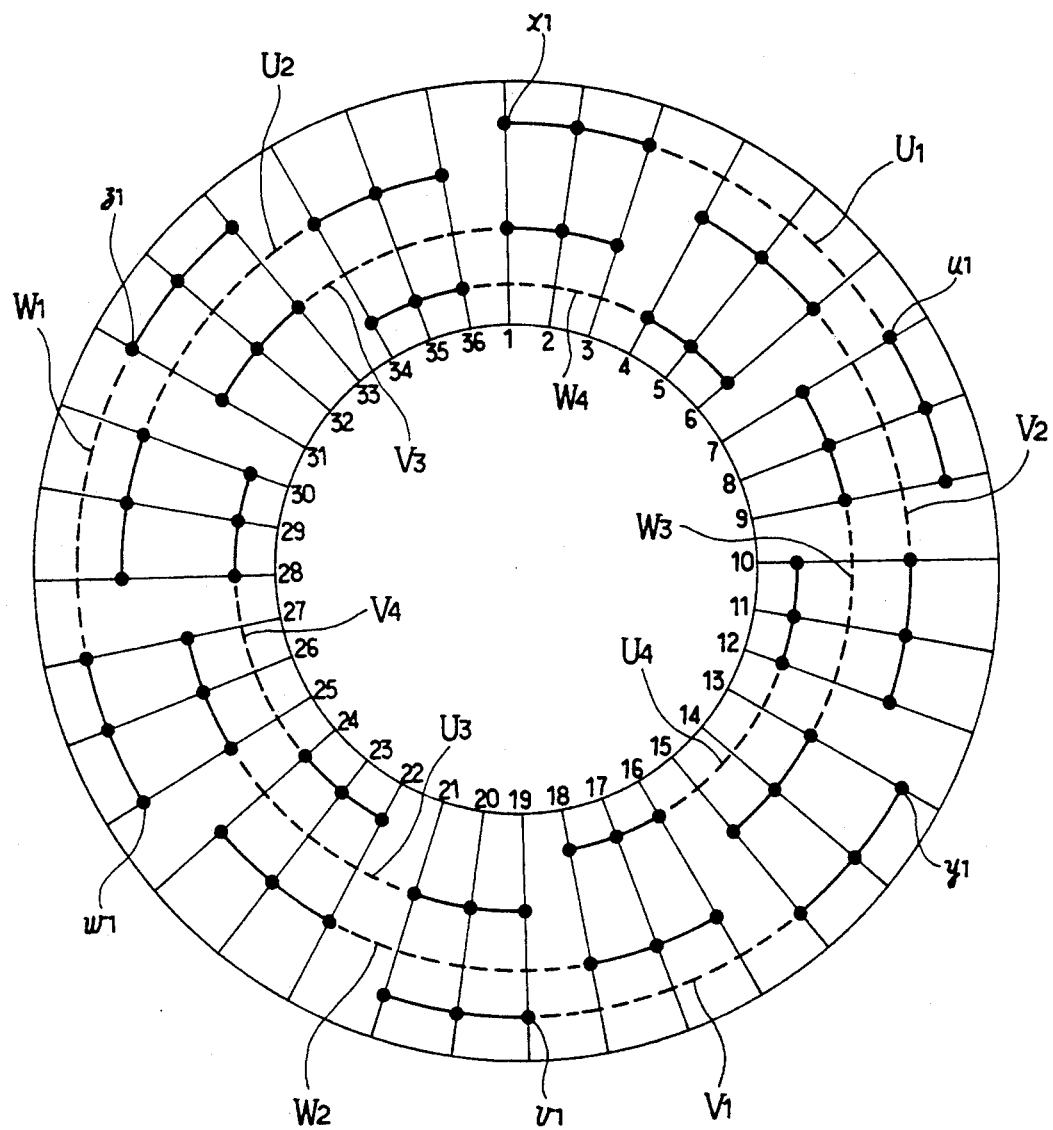
FIGS. 28 to 30 are views similar to FIG. 6 illustrating sixteenth to eighteenth embodiments respectively.
Figure 29:
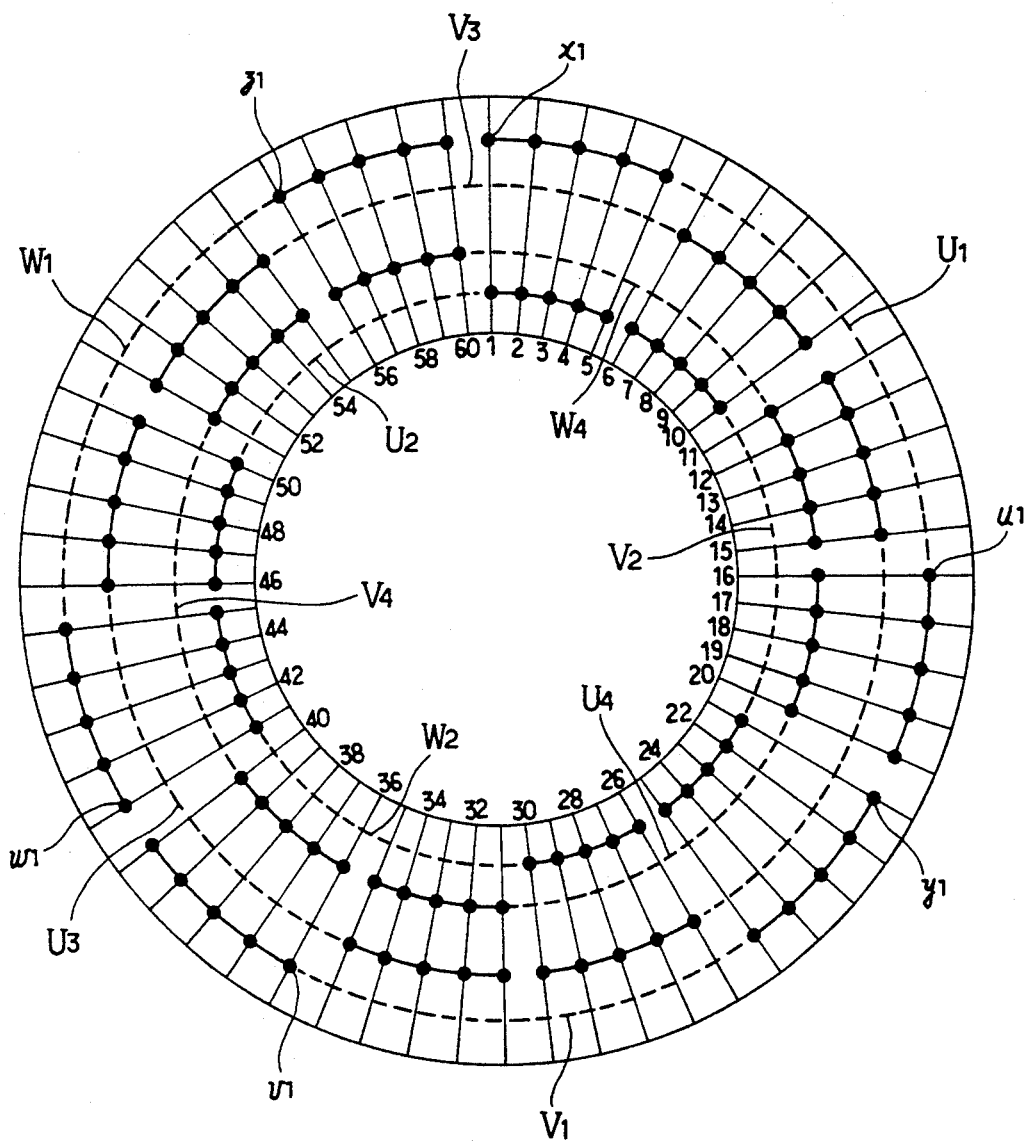
Figure 30:
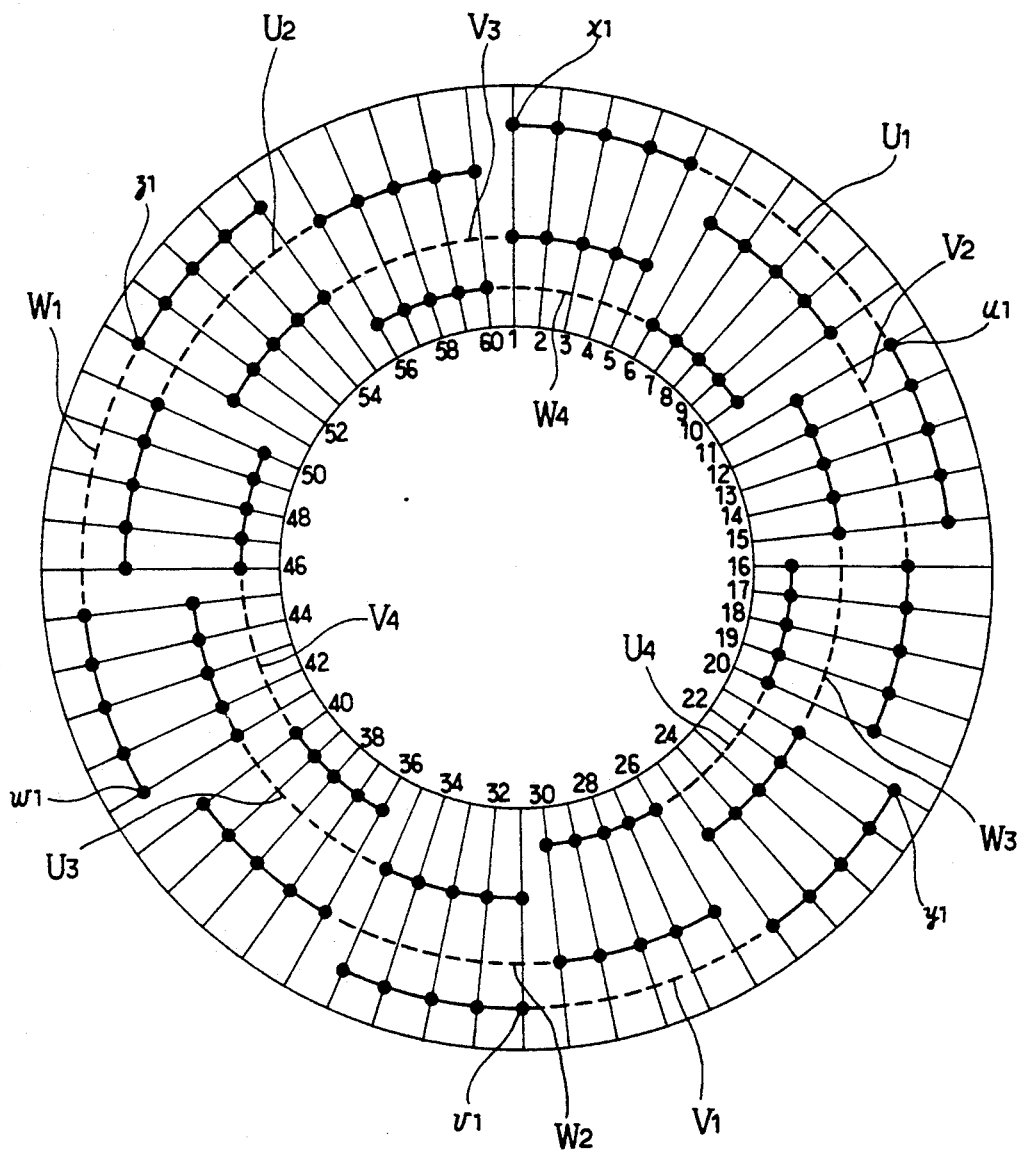
Figure 36:
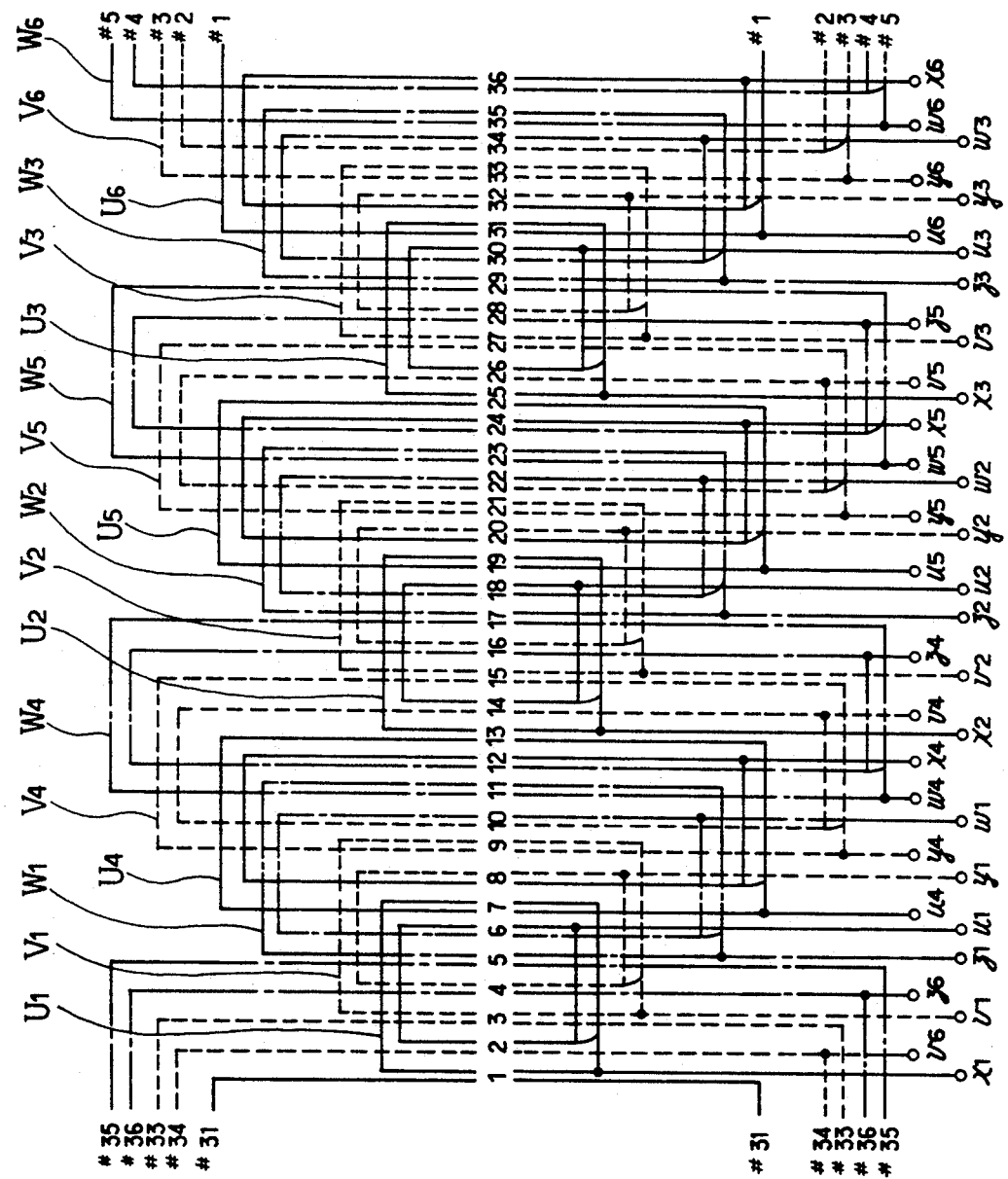
FIGS. 36 and 37 are views similar to FIGS. 5 and 6 illustrating a twentieth embodiment respectively.
Figure 37:
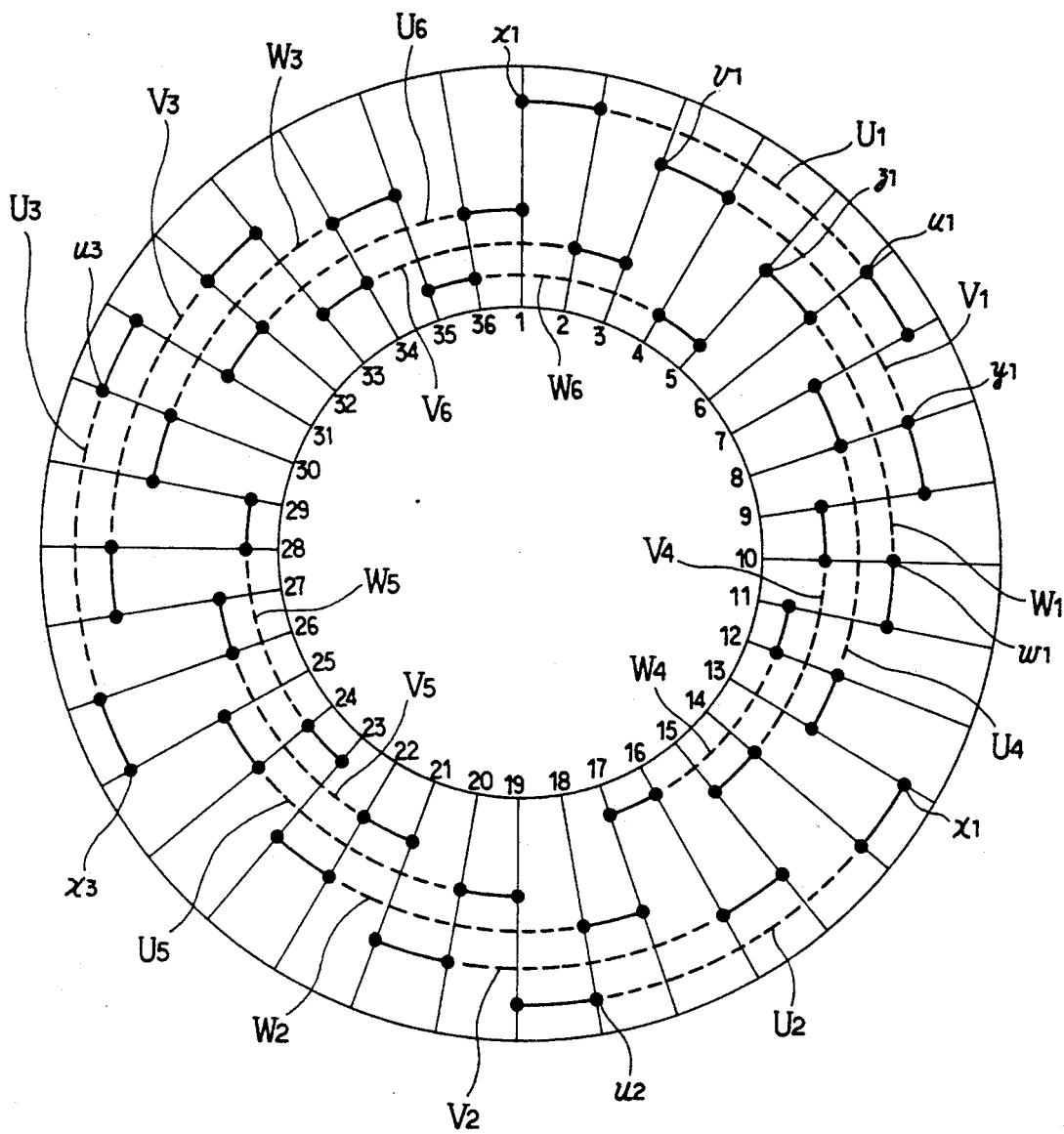
Figure 38:
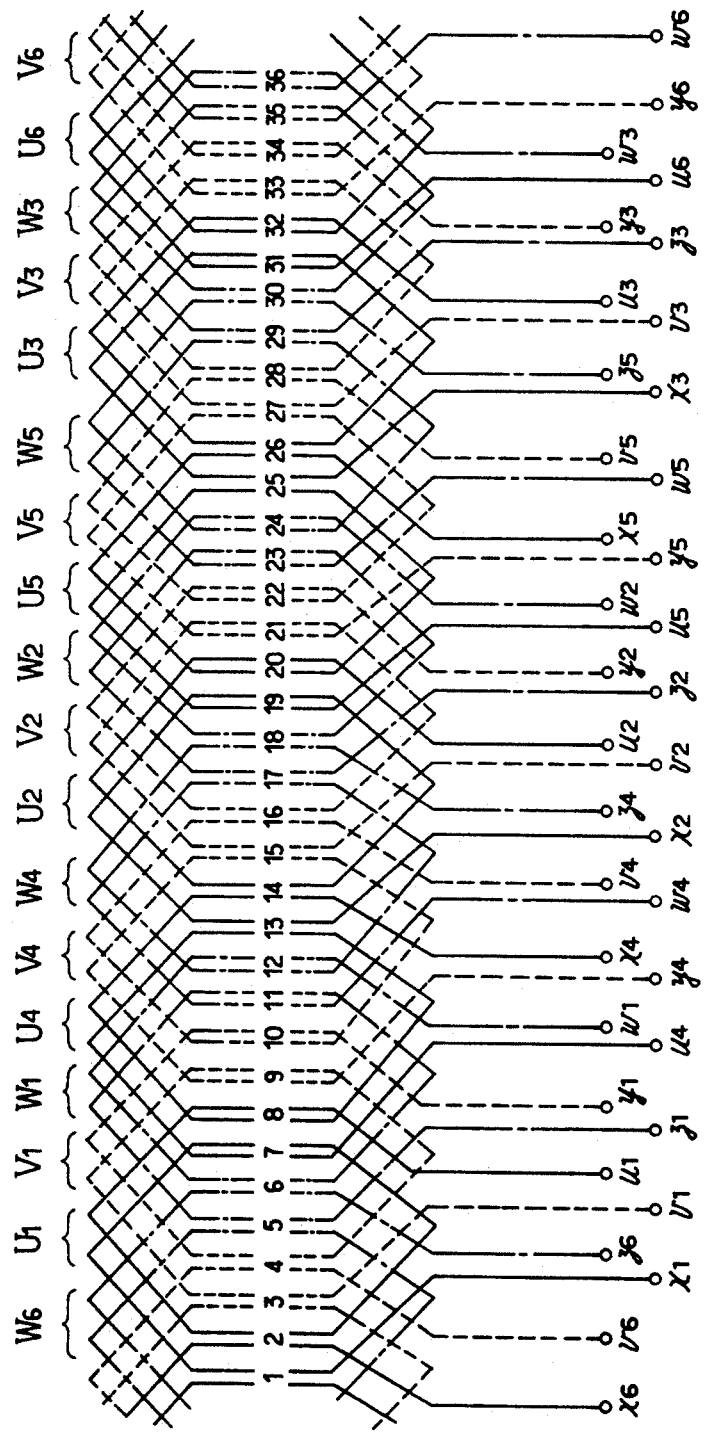
FIGS. 38 and 39 are views similar to FIGS. 12 and 13 illustrating a twenty-first embodiment respectively.
Figure 39:
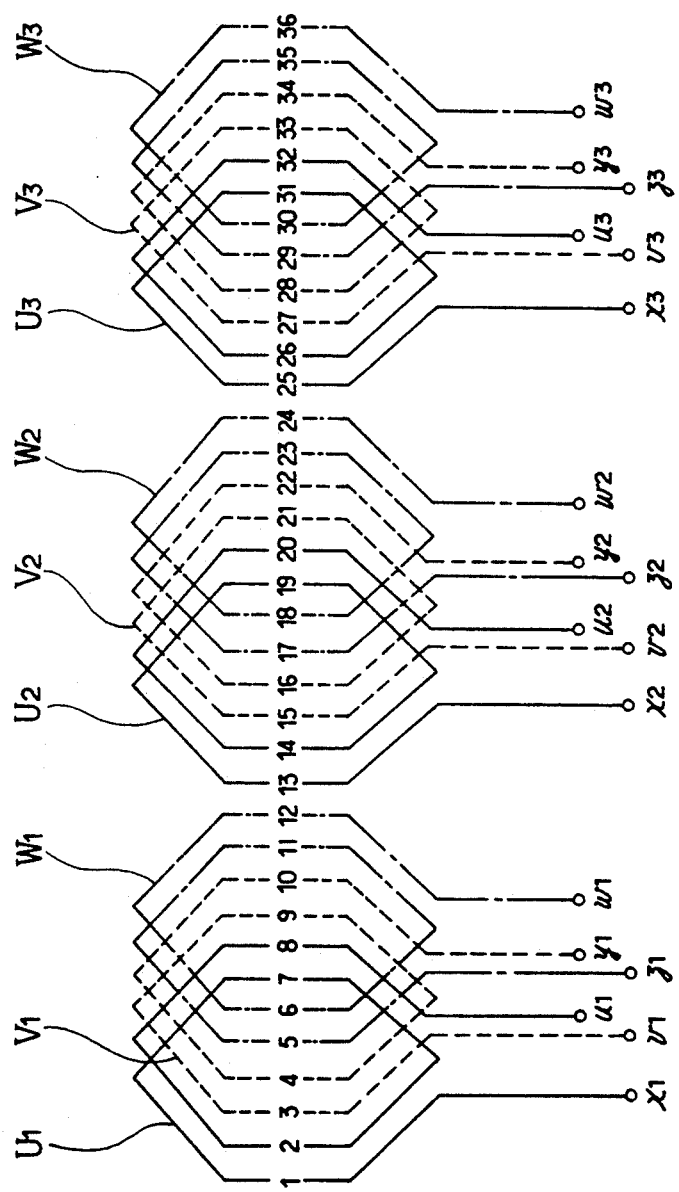
Figure 41:
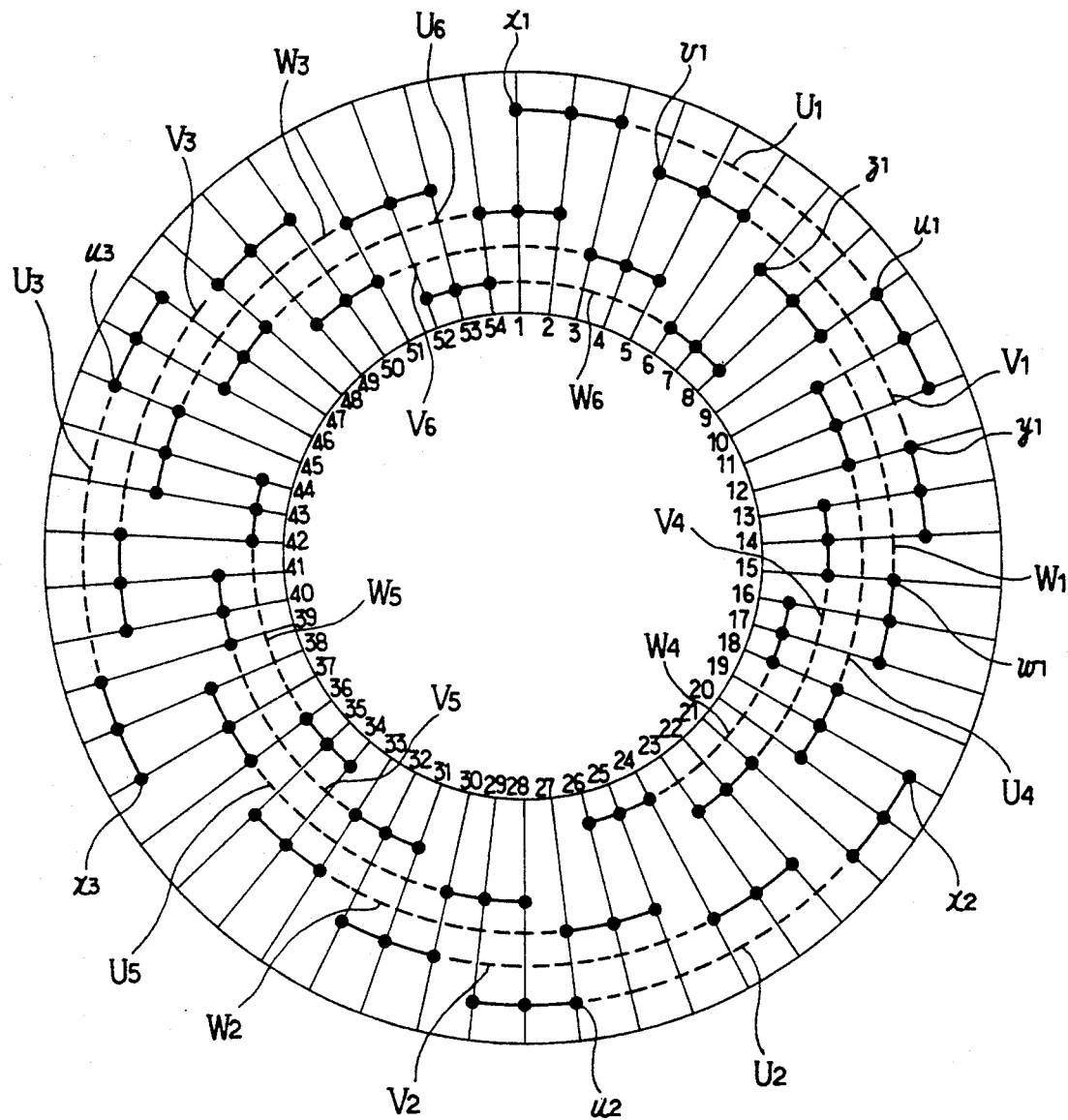
FIGS. 41 to 43 are views similar to FIG. 6 illustrating twenty-fourth to twenty-sixth embodiments respectively.
Figure 42:
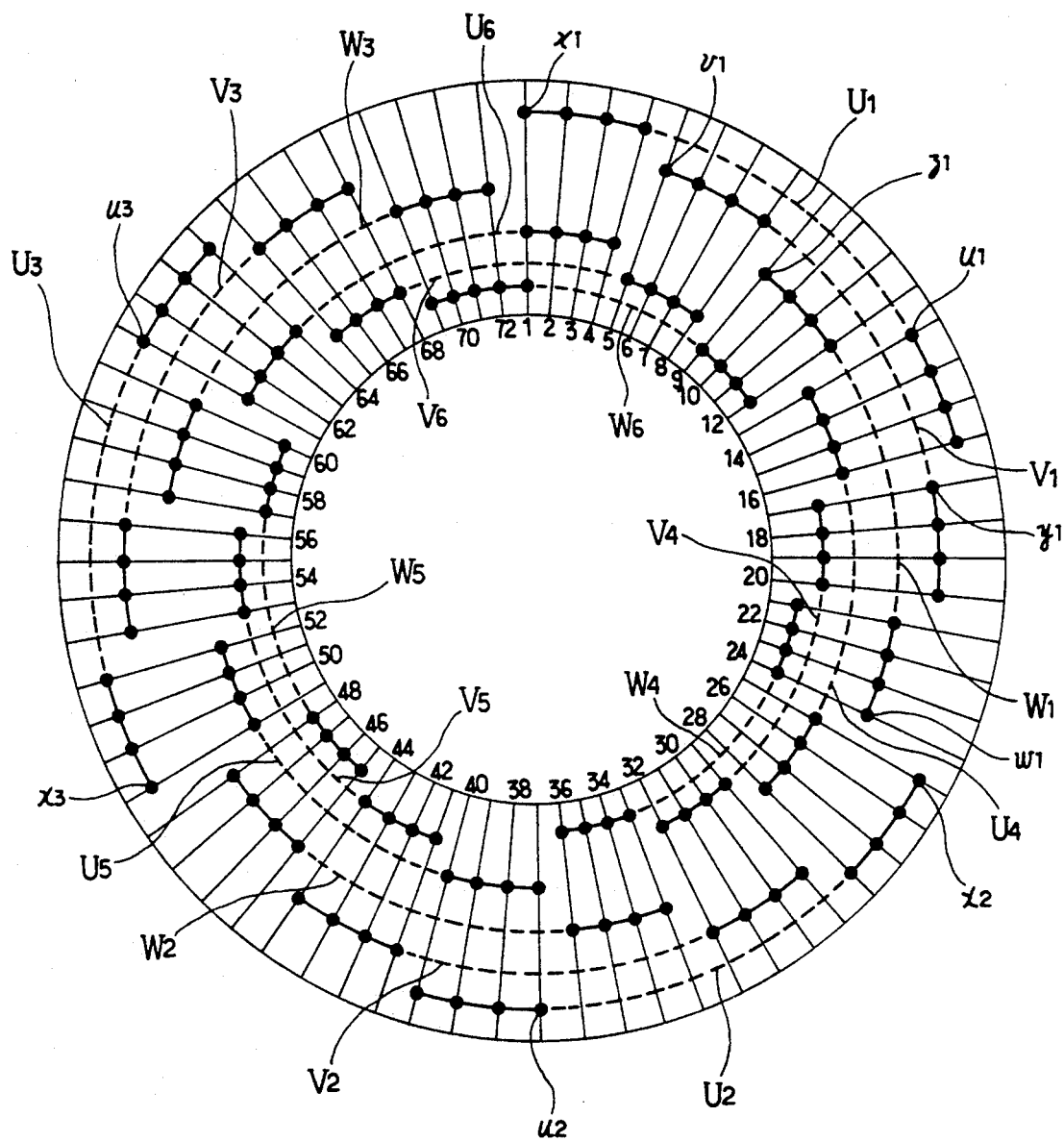
Figure 43:
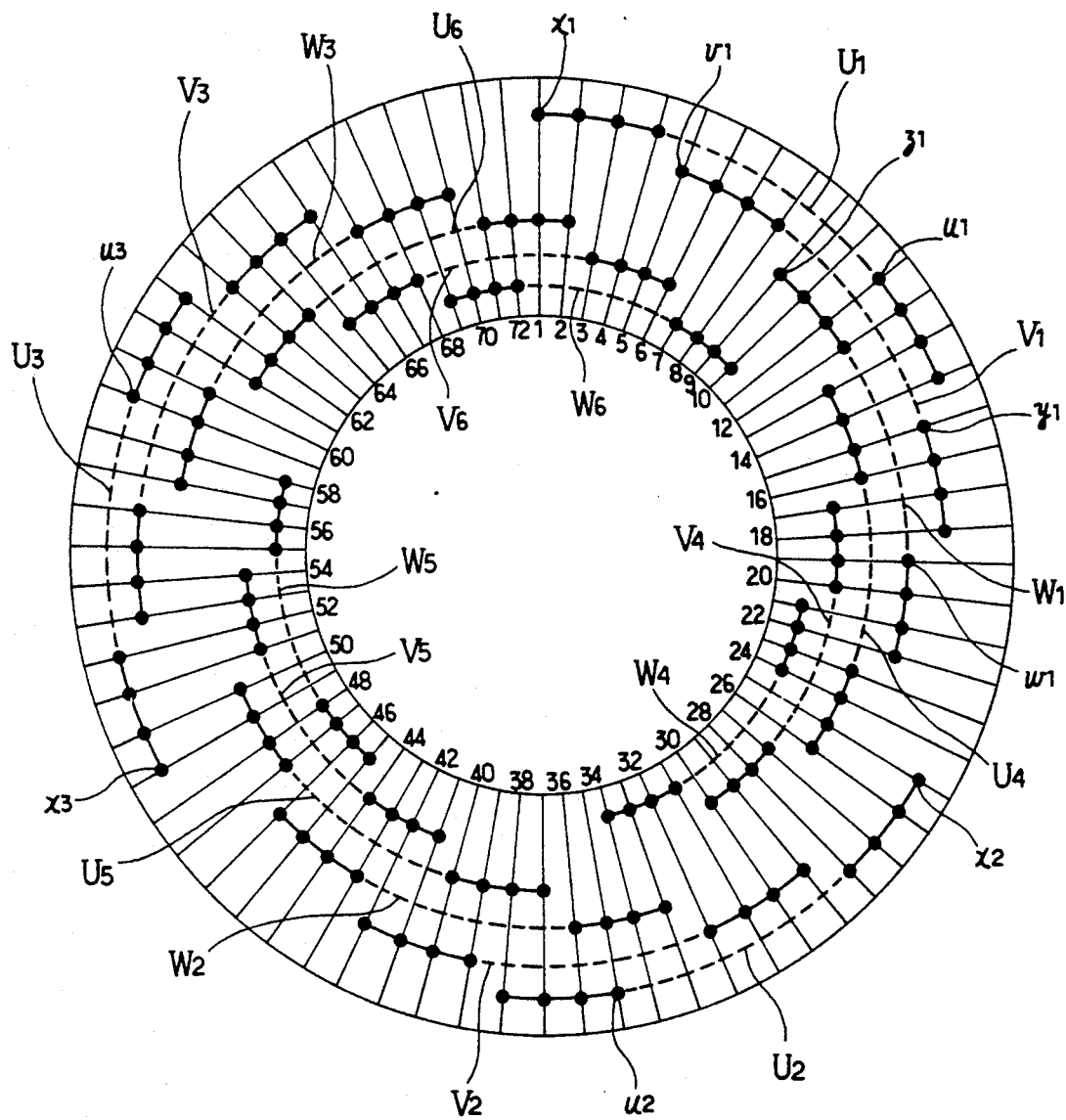
Figure 44:
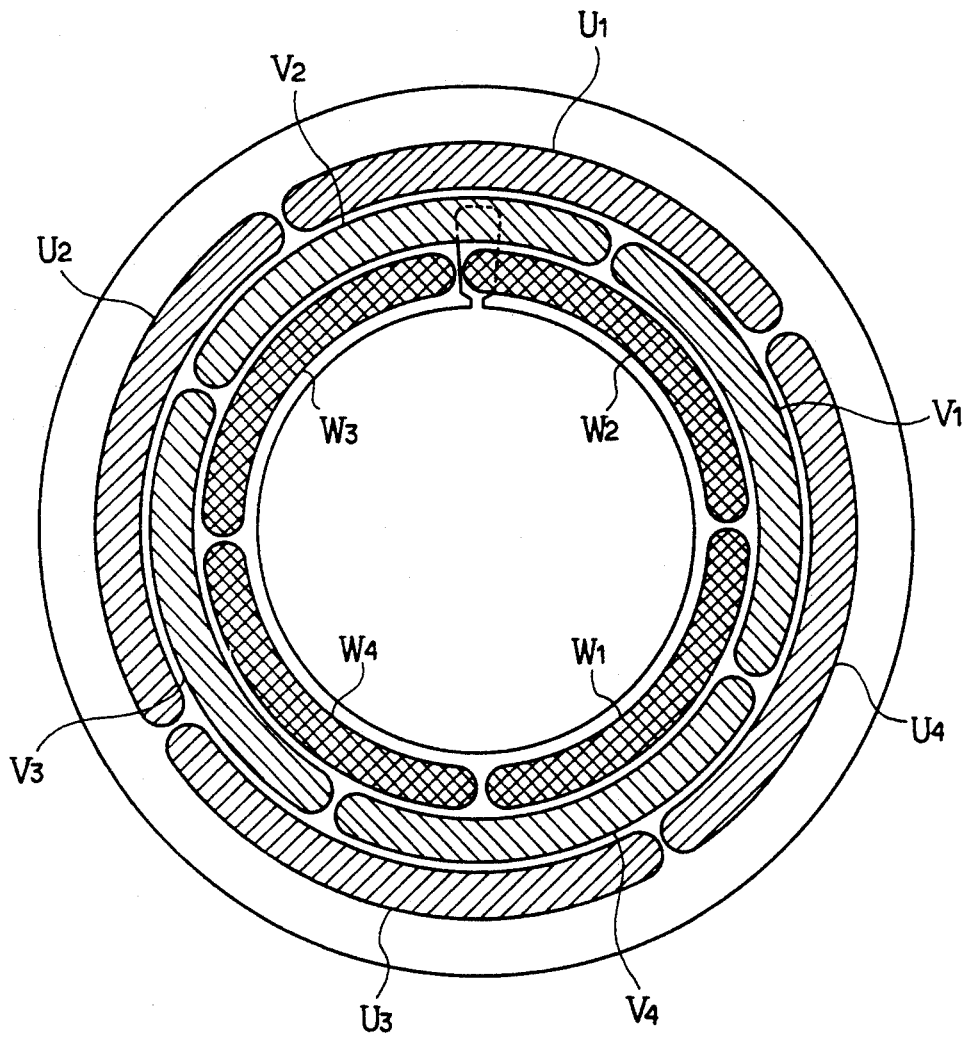
FIG. 44 is a view illustrating the arrangement of a conventional three-phase armature winding as viewed from the end winding side.

In relations between the above-described armature winding arrangements and drawing figures, the first arrangement corresponds to the embodiments shown in FIGS. 1-11, 14, 15-17, the second arrangement the embodiment shown in FIGS. 12 and 13, the third arrangement the embodiments shown in FIGS. 18-24, 27 and 29, the fourth arrangement the embodiments shown in FIGS. 28 and 30, the fifth embodiment the arrangement shown in FIGS. 25 and 26, the sixth arrangement the embodiments shown in FIGS. 31-35, 40 and 42, the seventh arrangement the embodiments shown in FIGS. 36, 37, 41 and 43, the eighth arrangement the embodiment shown in FIGS. 38 and 39, and the ninth arrangement will be described with reference to FIG. 43.

Figure 1:
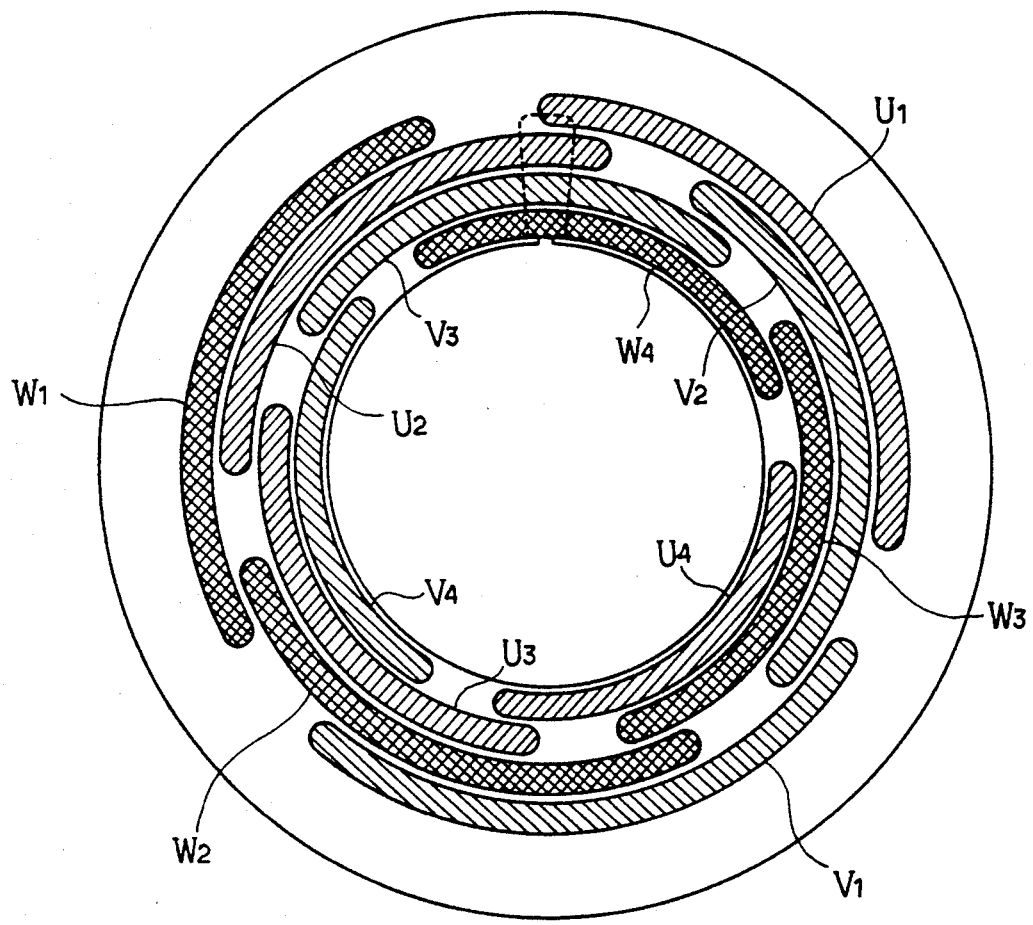
FIG. 1 is a view illustrating the arrangement of the three-phase armature winding of a first embodiment of the present invention as viewed from the end winding side.
Figure 2:
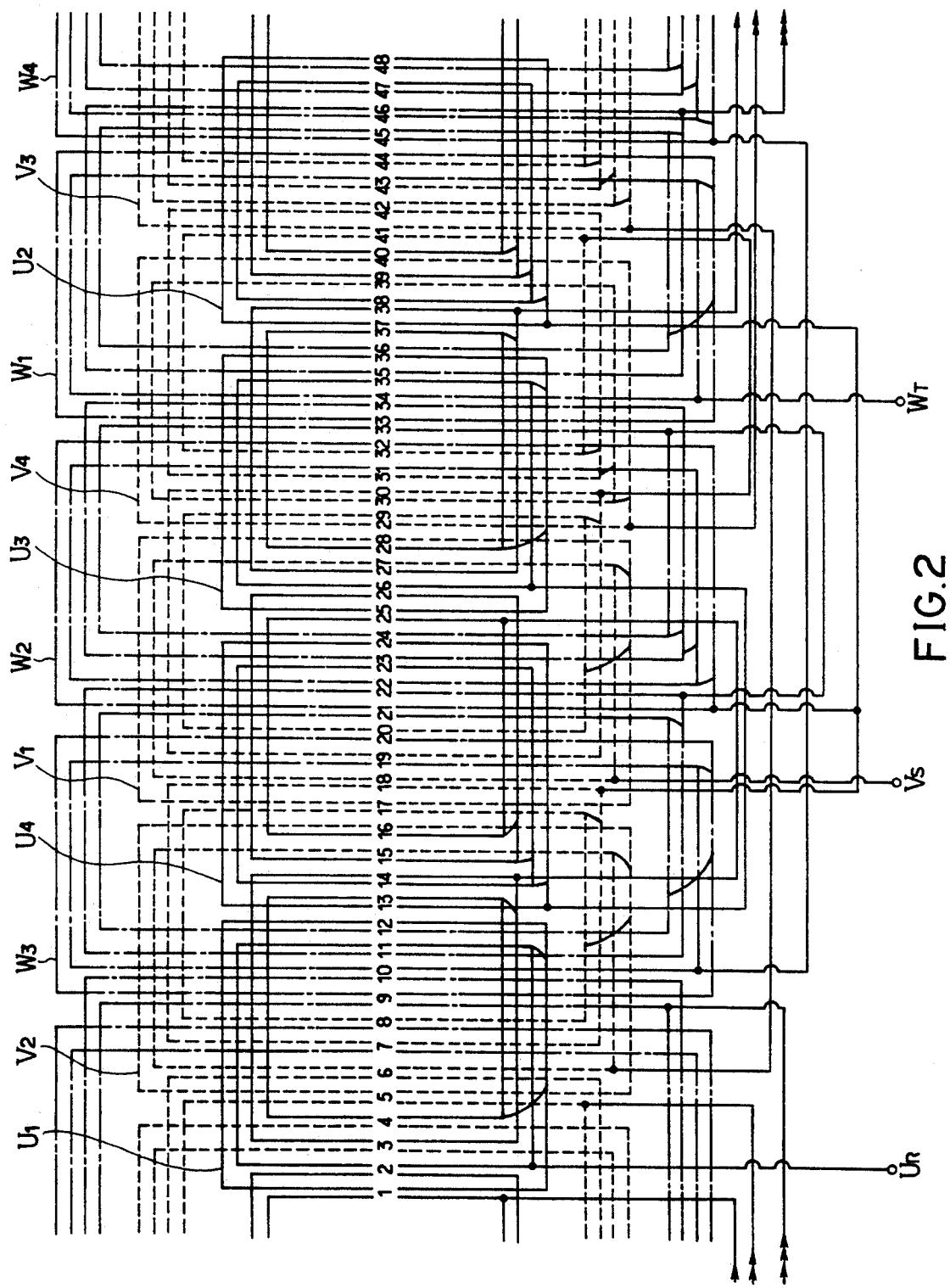
FIG. 2 is a development of the windings.

Referring to FIGS. 1 and 2, a first embodiment will now be described. A four-pole concentric lap winding laid in forty-eight armature core slots will be described in the first embodiment.

In the drawings, numerals 1 to 48 designate slot numbers. Reference symbols U1 to U4 designate first to fourth pole windings of the phase U respectively. Reference symbols V1 to V4 designate first to fourth pole windings of the phase V respectively. Reference symbols W1 to W4 designate first to fourth pole windings of the phase W respectively.

Figure 3:
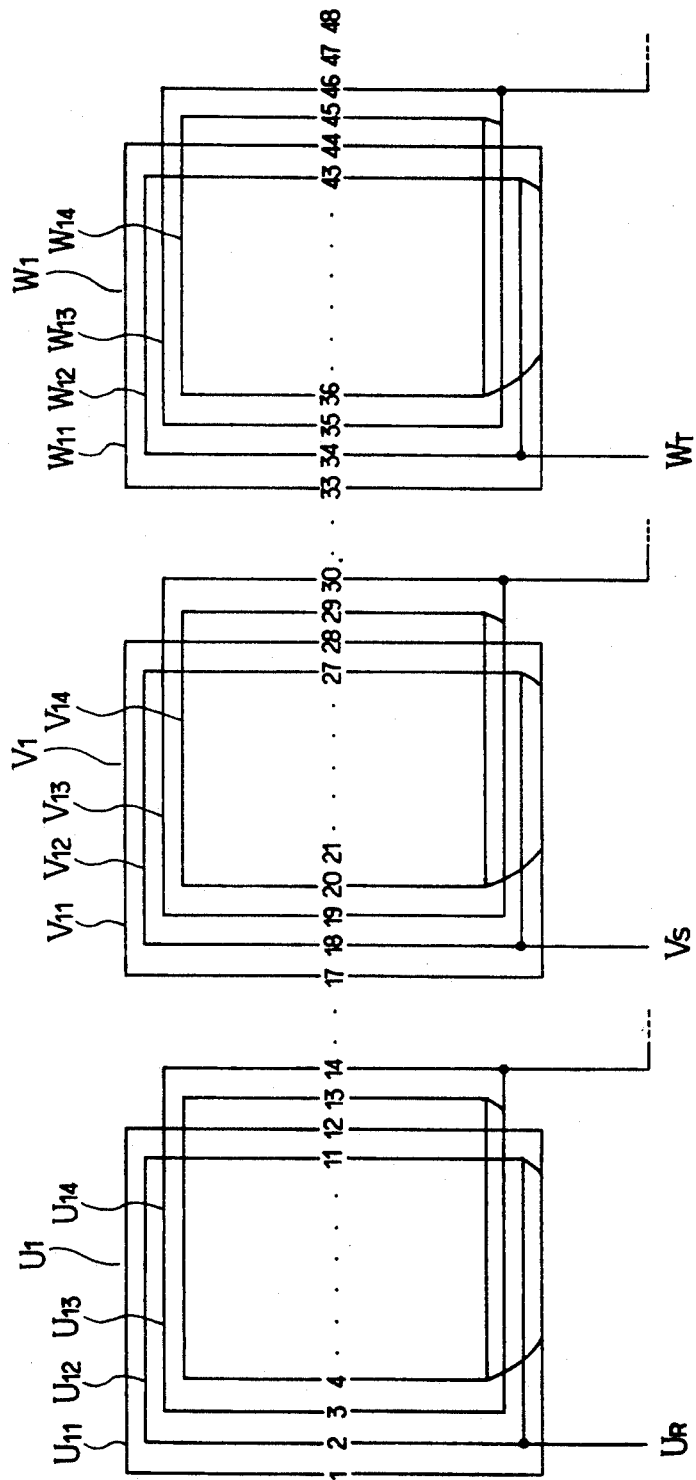
FIG. 3 is a view illustrating first pole windings of the three phases.

The number q of slots per pole per phase is obtained as $48/3 \times 4 = 4$. Each pole winding of each phase comprises four coils in series and is formed into a concentric double-layer winding. More specifically, with respect to the first pole windings U1, V1 and W1 of the respective phases as shown in FIG. 3, the pole winding U1 comprises four coils U11–U14 in series and the other pole windings U2–U4, V1–V4 and W1–W4 each comprise four coils in series, too. Each group of series coils comprises two kinds of coils with two different coil pitches 11 and 9 connected to one another. For example, the first pole winding U1 of the phase U comprises a coil U12 (with coil pitch of 9) laid in slots #2 and #11, a coil U11 (with coil pitch of 11) laid in slots #1 and #12, the coil U14 (with coil pitch of 9) laid in slots #4 and #13, and a coil U13 (with coil pitch of 11) laid in slots #3 and #14, these coils being sequentially connected. The other poles in the phase U and the coils in the other phases are also formed by connecting four coils with two kinds of coil pitches, 9 and 11.

Three same pole windings of the respective phases are positioned in respective first divided regions obtained by dividing a whole slot region of the armature core into three equal regions. For example, the first pole winding U1 of the phase U is positioned in the divided region having the slots #1–#14, the first pole winding V1 of the phase V in the divided region having the slots #17–#30, and the first pole winding W1 of the phase W in the divided region having the slots #33–#46. Further, the windings U2, V2, W2 of the subsequent or second poles of the phases are positioned in respective second divided regions obtained by dividing the whole slot region of the armature core into three equal regions, the second divided regions being shifted an electrical angle of 60 degrees relative to the first divided regions respectively. The pole windings U3, V3, W3 of the subsequent or third poles are also positioned in respective third divided regions obtained by dividing the whole slot region of the armature core into three equal regions, the third divided regions being shifted by an electrical angle of 60 degrees relative to the second divided regions respectively. Additionally, the pole windings U4, V4, W4 of the subsequent or fourth poles are also positioned in respective fourth divided regions obtained by dividing the whole slot region into three equal regions, respectively, the fourth divided regions being shifted by an electrical angle of 60 degrees relative to the third divided regions respectively.

The order of insertion of the above-described windings into the slots will be described. First, the pole windings U1, V1, W1 isolated from one to another by an electrical angle of $4\pi/3$ (corresponding to the true mechanical angle of 120 degrees) are simultaneously laid in the slots. Then, the pole windings U2, V2, W2 also isolated from one to another by an electrical angle of $4\pi/3$ are simultaneously laid in the slots, and the pole windings U3, V3, W3 and U4, V4, W4 are simultaneously laid in the slots in order. Accordingly, the coil insertion is completed by four times of inserting works, which number corresponds to the number of poles. Subsequently, a step of shaping the end windings is performed.

In accordance with the above-described winding insertion order, each set of three pole windings is simultaneously laid in the slots. For example, the set of the pole windings U1, V1, W1 can be simultaneously laid in the slots since the set comprises the coils which do not have any coil sides laid in the same slots together. Furthermore, the number q of slots in each pole of each phase is determined such that a double-layer winding portion is formed as the result of the simultaneous insertion of the second pole windings U2, V2, W2 following that of the first pole windings U1, V1, W1. Additionally, each coil side has the same and one radial position in all the phases, and only the position of each pole in the same phase radially differs from one another.

The armature winding formed in accordance with the above-described positional relationship and insertion order of the pole windings is of a concentric double-layer winding type wherein two coil sides are laid in each slot. Referring to FIG. 2, the coil side laid in the bottom (or outer diameter side of the armature core) of each slot is shown as being positioned at the right-hand side of the slot number and the coil side laid in the upside (or inner diameter side of the armature core) of each slot is shown as being positioned at the left-hand side of the slot number. TABLE 1 shows the positional relationship of all the coils in the slots. "Bottom" in TABLE 1 shows that the coil side is laid in the bottom (outer diameter side of the armature core) of the slot and "upside" that the coil side is laid in the upside (inner diameter side) of the slot.

TABLE 1

| | Coil pitch | | | |
| --- | --- | --- | --- | --- |
| | 11 | | 9 | |
| U1 | bottom—bottom | bottom—bottom | bottom—bottom | bottom—bottom |
| U2 | bottom—bottom | bottom-upside | bottom—bottom | bottom-upside |
| U3 | bottom-upside | upside—upside | bottom-upside | upside—upside |
| U4 | upside—upside | upside—upside | upside—upside | upside—upside |
| V1 | bottom—bottom | bottom—bottom | bottom—bottom | bottom—bottom |
| V2 | bottom—bottom | bottom-upside | bottom—bottom | bottom-upside |
| V3 | bottom-upside | upside—upside | bottom-upside | upside—upside |
| V4 | upside—upside | upside—upside | upside—upside | upside—upside |
| W1 | bottom—bottom | bottom—bottom | bottom—bottom | bottom—bottom |
| W2 | bottom—bottom | bottom-upside | bottom—bottom | bottom-upside |
| W3 | bottom-upside | upside—upside | bottom-upside | upside—upside |
| W4 | upside—upside | upside—upside | upside—upside | upside—upside |

In accordance with the above-described embodiment, all the coils can be laid in the slots by four times of the insertion works with the automatic coil inserter. Consequently, the productivity can be improved as compared with in the conventional double-layer lap winding wherein the coils are manually laid in the slots.

Furthermore, since the armature winding in accordance with the invention is of the concentrically wound double-layer type, the number of conductors composing each single coil is the half of that in the conventional concentric single-layer type. Accordingly, since the volume of each coil is decreased to the half of that in the prior art, the work of inserting the coils into the slots can be simplified and the end windings can be shaped readily. Such readiness in shaping the end windings means that the shaping can be performed without obtaining a sufficient length of each end winding. Consequently, an axial dimension of each coil can be reduced and an amount of copper contained in each coil and the weight of each coil can be reduced Further, a sufficient insulation distance can be secured between each coil and a housing. Further, since the shaping pressure can be reduced, the occurrence of damage to the coil insulating coating can be reduced Additionally, since the end windings of the coils of each phase are uniformly disposed so as to take the same radial position with respect to the same pole, the length of the end windings is approximately equal in each phase. Consequently, an impedance in the coils in each phase is rendered equal, which can prevent the occurrence of the unbalance in the excitation current and reduction in the electrical characteristics due to the impedance unbalance.

Figure 4:
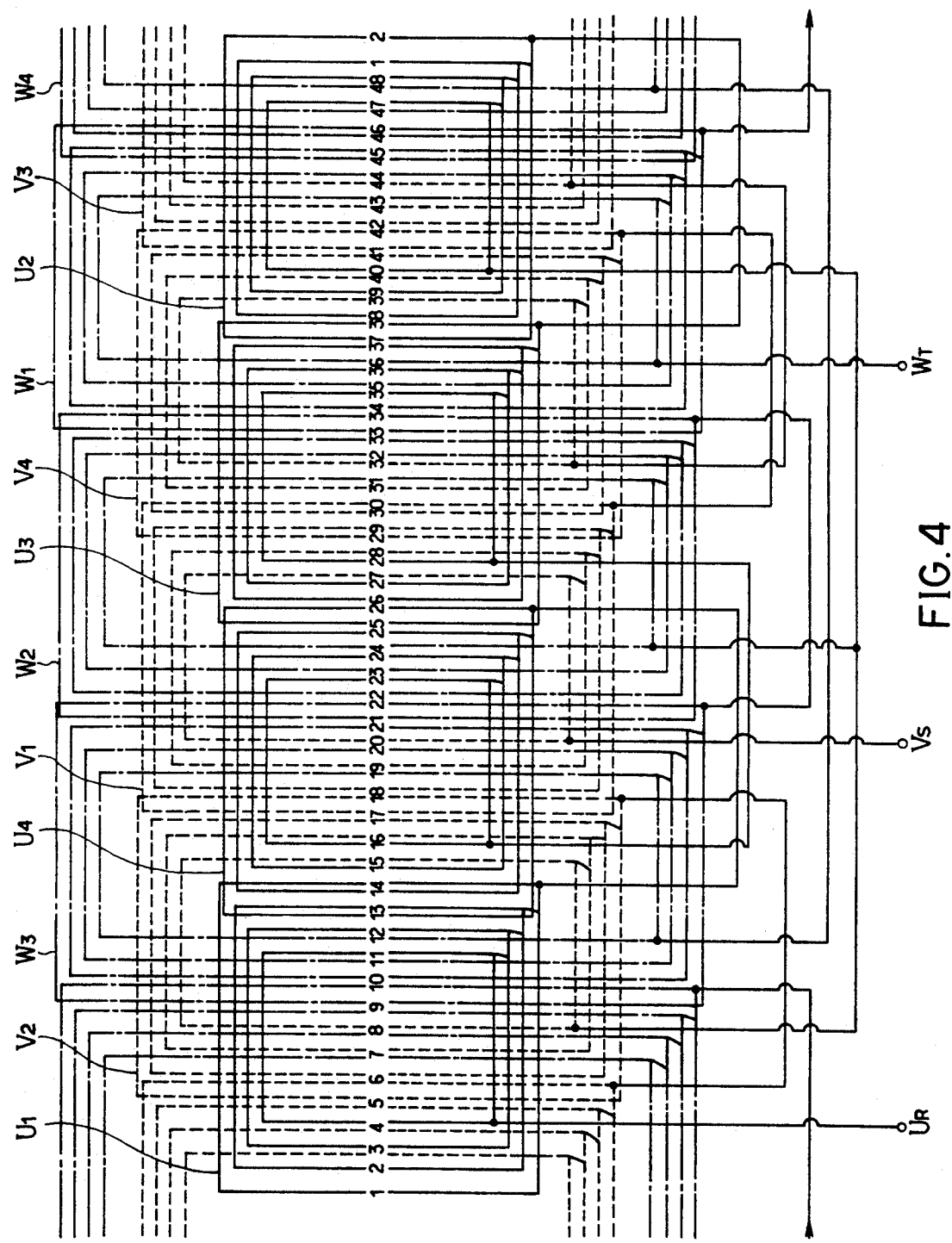
FIG. 4 is a development of the windings of the three-phase armature winding of a second embodiment.
Figure 5:
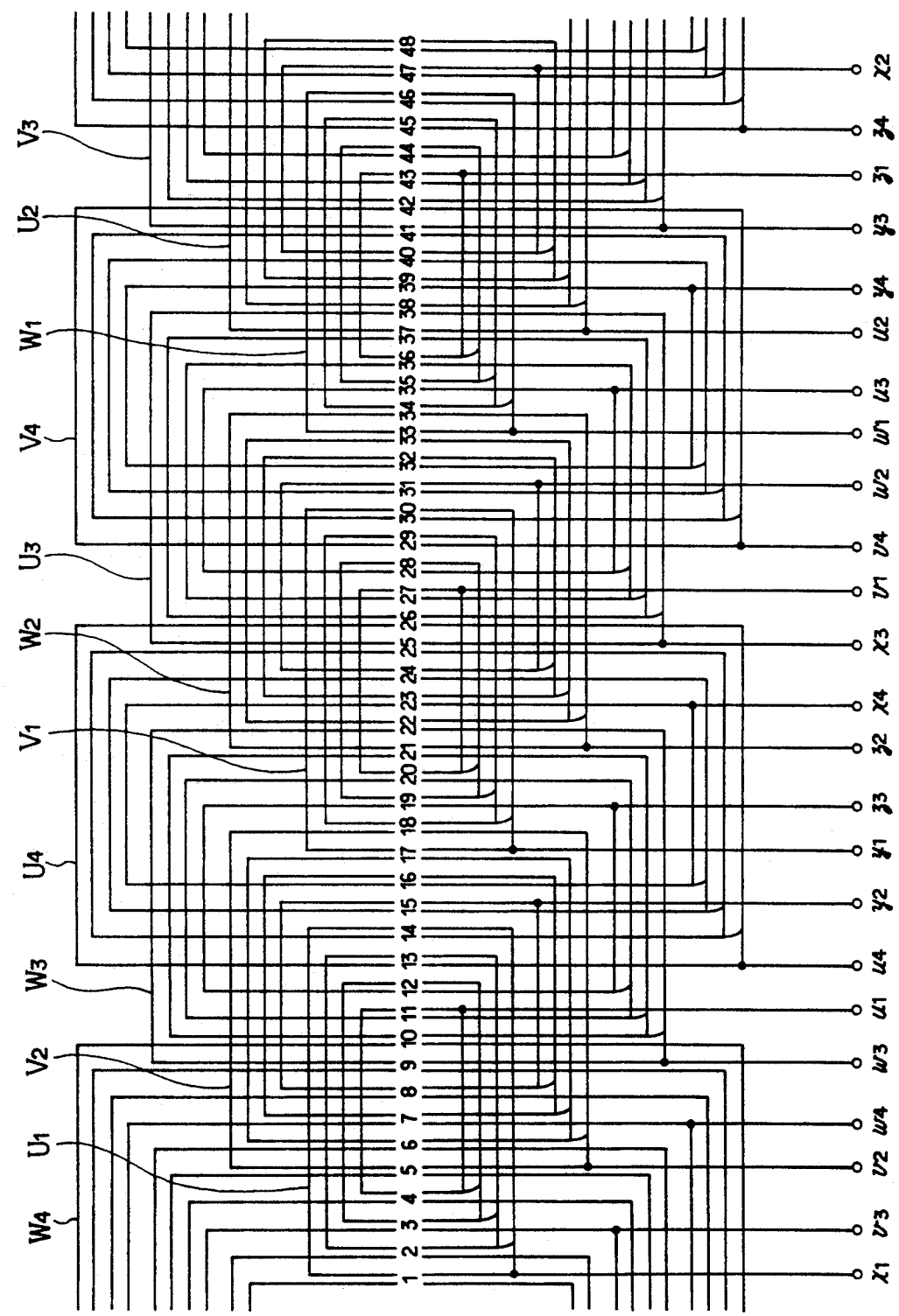
FIG. 5 is a development of the windings of the three-phase armature winding of a third embodiment.

FIG. 4 shows a second embodiment of the invention. The second embodiment differs from the above-described first embodiment in that the coil of each pole in each phase comprises series coils with four coil pitches, 13, 11, 9 and 7. The relationship between the slots and the coils laid in the slots and the like are the same as in the previous embodiment, and the same effect can be achieved in the second embodiment as in the previous embodiment.

FIGS. 5 to 9 illustrate a third embodiment wherein the four-pole armature winding of the concentric double-layer type laid in forty-eight slots.

In the drawings, numerals 1 to 48 designate slot numbers. Reference symbols U1 to U4 designate first to fourth pole windings of the phase U respectively Reference symbols V1 to V4 designate first to fourth pole windings of the phase V respectively. Reference symbols W1 to W4 designate first to fourth pole windings of the phase W respectively. The number q of slots in each pole of each phase is obtained as $48/3 \times 4 = 4$.

Figure 7:
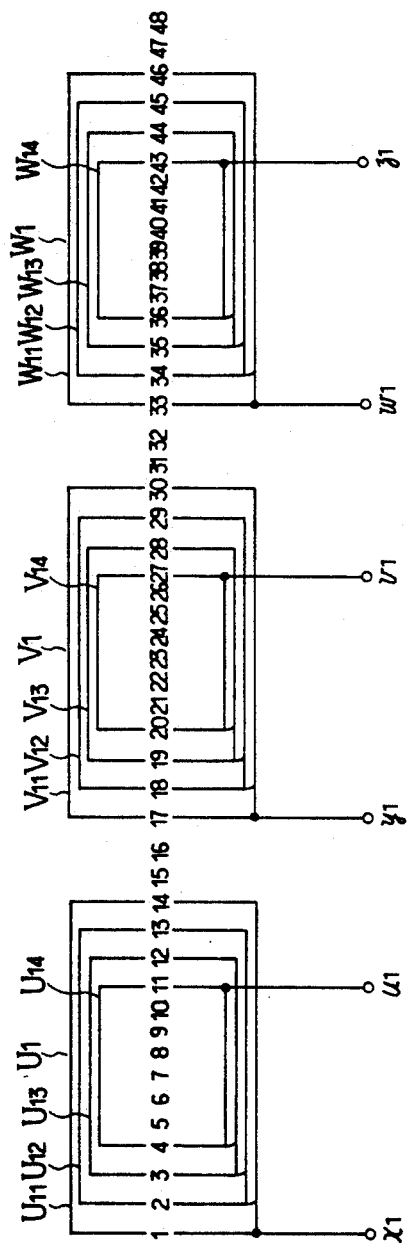
FIG. 7 is a development of first pole windings of three phases of the windings shown in FIG. 5.

Each pole winding of each phase comprises four concentrically wound coils U11–U14, V11–V14, W11–W14 the number of which corresponds to the number q of the slots in each phase in each pole, as shown in FIG. 7 in which the first pole in each phase is presented. Since each phase is formed on the same principle, the first pole winding U1 of the phase U will be described in detail. The first pole winding U1 of the phase U comprises a first coil U11 with the coil pitch of 13 laid in the slots #1 and #14, a second coil U12 with the coil pitch of 11 laid in the slots #2 and #13, a third coil with the coil pitch of 9 laid in the slots #3 and #12, and a fourth coil U14 with the coil pitch of 7 laid in the slots #4 and #11. Thus, the first pole winding U1 of the phase U comprises q number of coils or four coils different in the coil pitch from one another.

The first pole windings U1, V1, W1 of the respective phases are shifted from one another by an electrical angle of 120 degrees corresponding to $p\pi/3$ where p is the number of poles. Subsequently, one coil sides of the second pole windings V2, W2, U2 of different phases are laid in the slots inside the first pole windings U1, V1, W1. The above-described arrangement is applied to the other pole windings such that the concentric double-layer winding is formed TABLE 2 shows the positional relationship of the coil groups composing the respective windings.

TABLE 2

|    | Coil pitch |  |  |  |
|----|---|---|---|---|
|    | 13 | 11 | 9 | 7 |
| U1 | bottom-bottom | bottom-bottom | bottom-bottom | bottom-bottom |
| U2 | bottom-upside | bottom-upside | bottom-bottom | bottom-bottom |
| U3 | bottom-upside | bottom-upside | upside-upside | upside-upside |
| U4 | upside-upside | upside-upside | upside-upside | upside-upside |
| V1 | bottom-bottom | bottom-bottom | bottom-bottom | bottom-bottom |
| V2 | bottom-upside | bottom-upside | bottom-bottom | bottom-bottom |
| V3 | bottom-upside | bottom-upside | upside-upside | upside-upside |
| V4 | upside-upside | upside-upside | upside-upside | upside-upside |
| W1 | bottom-bottom | bottom-bottom | bottom-bottom | bottom-bottom |
| W2 | bottom-upside | bottom-upside | bottom-bottom | bottom-bottom |
| W3 | bottom-upside | bottom-upside | upside-upside | upside-upside |
| W4 | upside-upside | upside-upside | upside-upside | upside-upside |

The order of insertion of the coils into the slots will be described. A set of the first pole windings U1, V1, W1 of the three phases positioned on the same radius are treated in a first coil insertion work. Since all the coil sides of twelve coils composing these windings are laid in the bottom of the slots as shown in TABLE 2, the coils are set in the automatic coil inserter so that the windings are shifted from one another by an electrical angle of 240 degrees and simultaneously laid in the slots Subsequently, a set of second pole windings U2, V2, W2 is treated in a second coil insertion work. The coils are also set in the automatic coil inserter so that the windings are shifted from one another by an electrical angle of 240 degrees and simultaneously laid in the slots. As obvious from TABLE 2, the other coil sides of two coils with the coil pitches of 13 and 11 in each phase are laid in the upside of the slots. These coil sides are placed on the coils of the first pole windings of the same phase having the same coil pitch. Consequently, these coil sides are laid on the respective first pole windings and laid in the slots together with them. A set of three-phase third pole windings U3, V3, W3 is laid in the slots in a third coil insertion work in the same manner as described above. In this case, too, the coil sides of the first or second pole windings are previously laid in the slots in the upside of which the coil sides of the third pole windings are laid. Accordingly, these coil sides are placed on the first or second pole windings and laid. Lastly, the three-phase fourth windings U4, V4, W4 are laid in the slots by the automatic coil inserter in the same manner as described above such that all the coil sides of these windings are positioned at the upside of the slots and placed on the first, second or third windings. Consequently, the winding inserting work can be performed only at four times equal to the number of windings by the automatic coil inserter. Insulators are provided between different coils manually or mechanically when the coil sides of different coils are laid in the same slots.

Figure 6:
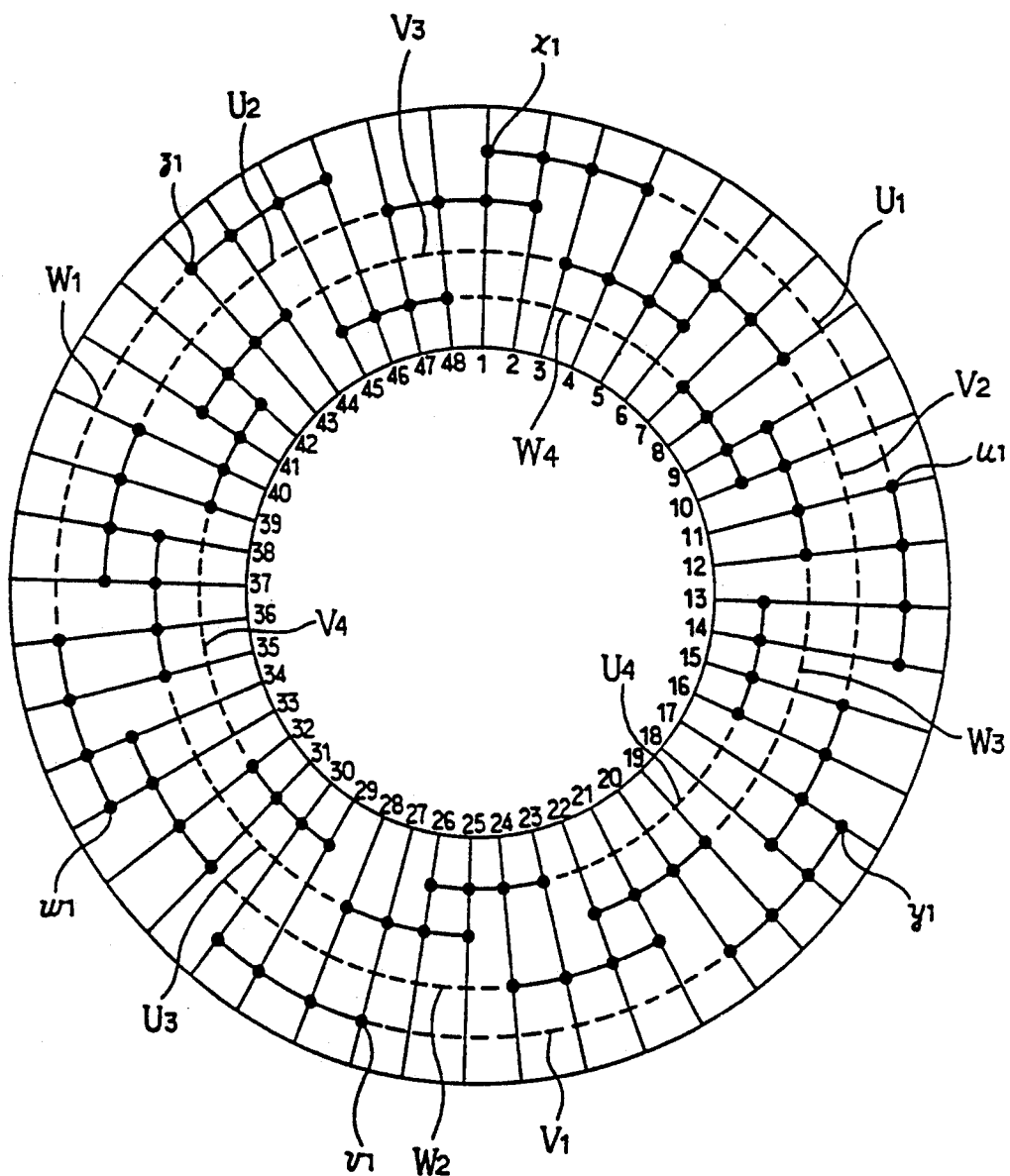
FIG. 6 is view illustrating the arrangement of the windings shown in FIG. 5.

FIG. 6 shows the radial positions of the end windings of the pole windings laid in the slots as described above. It is obvious that the radial positions are the same among the phases and balanced geometrically and electrically, as in the first embodiment.

Figure 9:
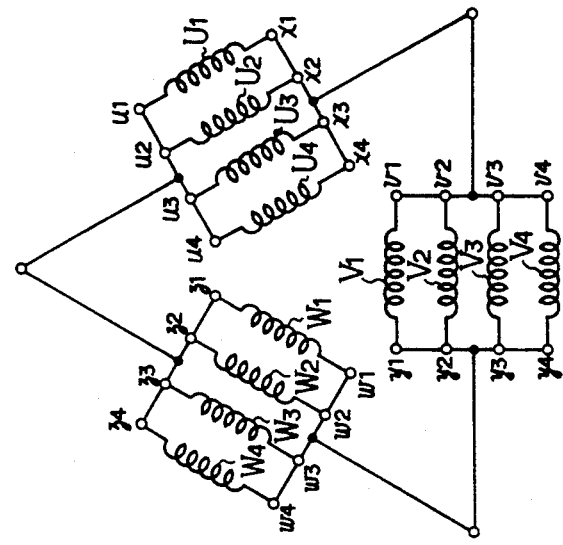
FIGS. 8 and 9 are views illustrating different connections of the three-phase pole windings.
Figure 8:
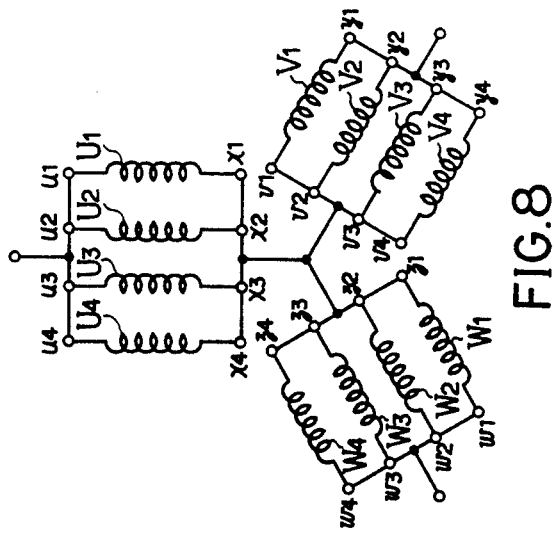

Concerning the connection of the coils, when the coils are connected as shown in FIG. 8, four parallel Y-connection circuits are obtained while four delta-connection circuits are obtained when they are connected as shown in FIG. 9. These parallel connections may also be employed in both the first and second embodiments.

Figure 10:
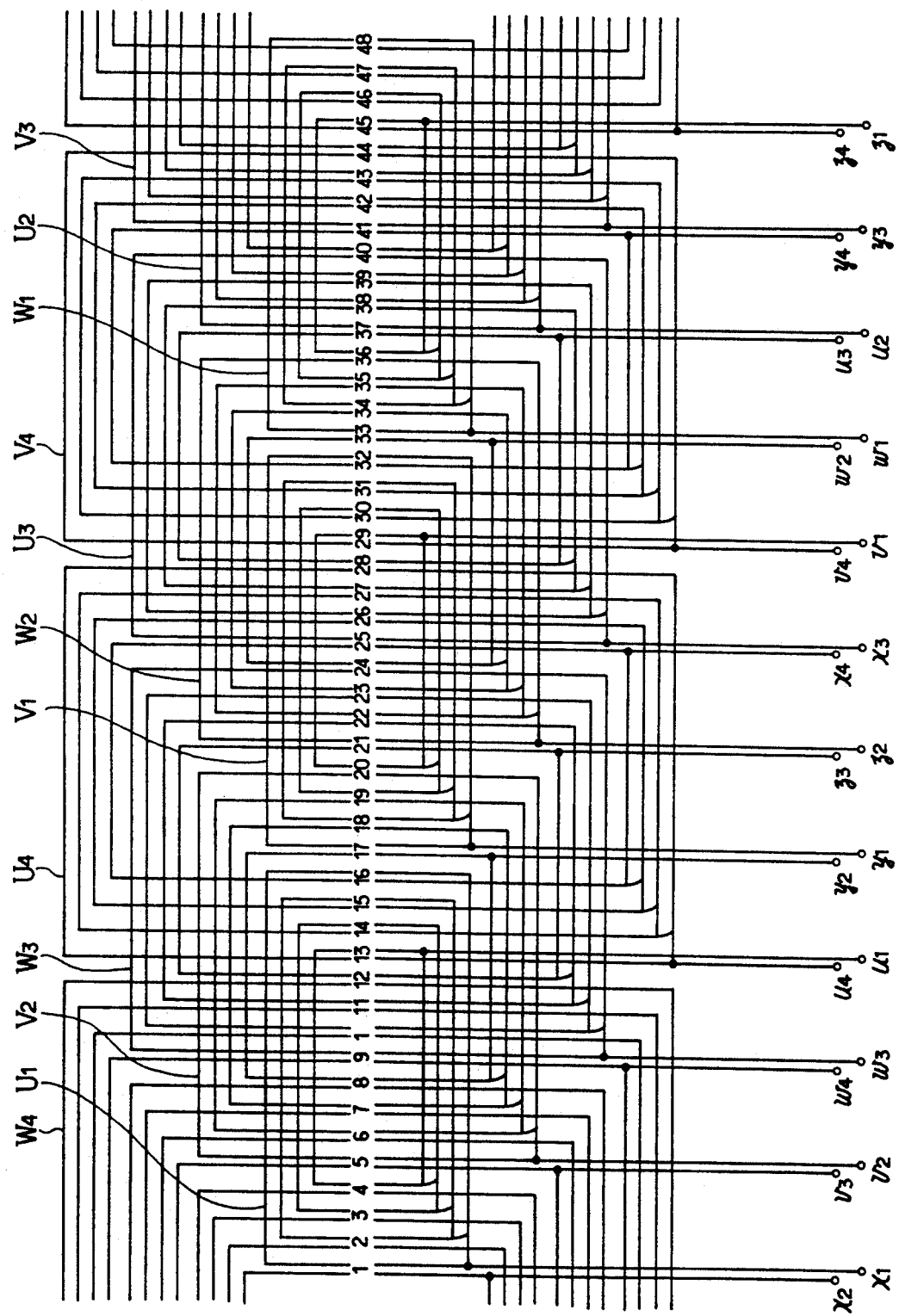
FIGS. 10 and 11 are views similar to FIGS. 5 and 6 illustrating a fourth embodiment respectively.

FIGS. 10 and 11 illustrate a fourth embodiment. The armature winding of the fourth embodiment is the same as that of the third embodiment in the 48-slot 4-pole concentric double-layer arrangement and different from that in the coil pitch.

The number of slots in each pole of each phase is four as in the third embodiment and the winding of each pole of each phase comprises four coils having different coil pitches in each poles of each phase. The coil pitches of the coils are 15, 13, 11 and 9. The other arrangement is the same as in the third embodiment. Referring to FIG. 11 showing the development of the coils, the end windings of each pole winding in the same pole of all the phases take the same radial position and are balanced geometrically and electrically. Consequently, the same effect can be achieved in the fourth embodiment as in the third embodiment. Further, since the coils of the same phase are laid, for example, in the slots #1–#4 in the upside-bottom relation, the inner insulators provided in the slots and interphase insulators provided between the end windings of the different phases can be eliminated. Additionally, the motor characteristics can be improved as the coil pitch is increased.

FIGS. 12 and 13 illustrate a fifth embodiment. The armature winding of the fourth embodiment is the same as that of the third embodiment in the 48-slot 4-pole arrangement and different from that in the lap winding type.

The winding of each pole in each phase comprises four coils with the coil pitch of 4 in series. FIG. 13 shows the three-phase first pole windings U1, V1 and W1. Each of the series coils in each pole winding is disposed in the adjacent slots in turn. The first pole windings U1. V1, W1 of the three phases are laid into the core slots by the automatic coil inserter as one set. Further, each of the other pole windings is configured in the same manner as described above and the same pole windings in the three phases are simultaneously laid as one set in the slots by the number of times corresponding to the number of poles. The coil arrangement is identical with that shown in FIG. 6.

Although the armature winding in the fifth embodiment is of the double-layer lap type, the coil insertion can be performed by the automatic coil inserter, which improves the productivity. The shaping of the end windings can be readily performed since the number of conductors in each coil is the half of that in the concentric single-layer type. Additionally, since the percent pitch is 83% when the coil pitch is 10, the harmonic distortion can be reduced, which improves the motor characteristics.

Figure 14:
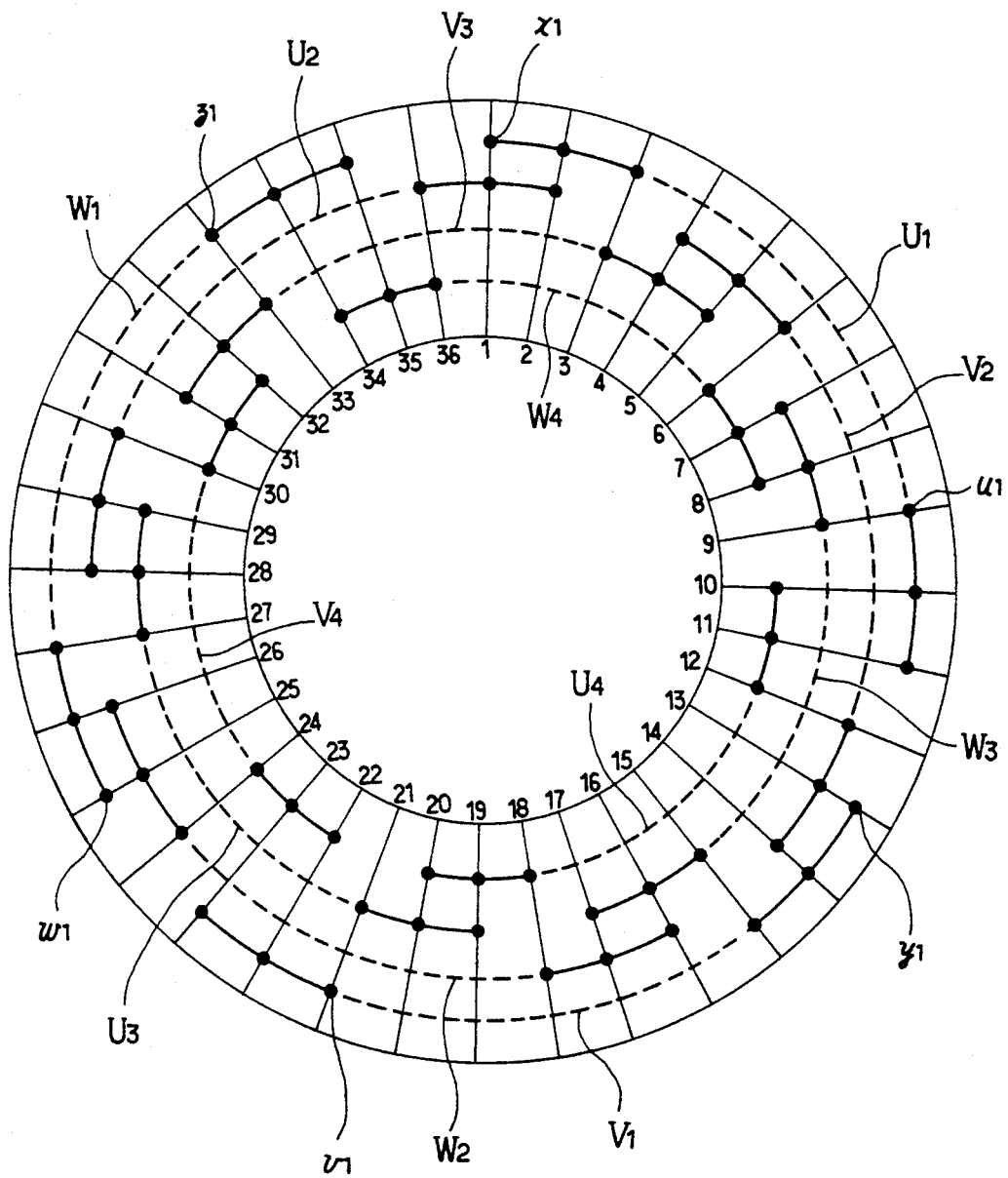
FIG. 14 is a view similar to FIG. 6 illustrating sixth and seventh embodiments.

FIG. 14 illustrates a sixth embodiment wherein the four-pole armature winding laid in thirty-six slots. The number q of slots of each pole in each phase is three, an odd number. Each pole winding in each phase comprises three or q number of concentrically wound coils with coil pitches of 10, 8 and 6 in turn. The pole windings in each phase are shifted from one another by an electrical angle of 240 degrees, and the same pole windings in three phases are simultaneously laid as one set in the slots by the number corresponding to that of poles such that the concentrically wound double-layer winding is obtained. The sixth embodiment differs from the third embodiment only in the number of slots and the coil pitches and achieves the same effect as in the third embodiment.

In a seventh embodiment, the four-pole armature winding of the double-layer lap type laid in thirty-six slots will be described. The coil pitch is eight and the percent pitch is 83%. The coil arrangement is identical with that shown in FIG. 14.

Figure 15:
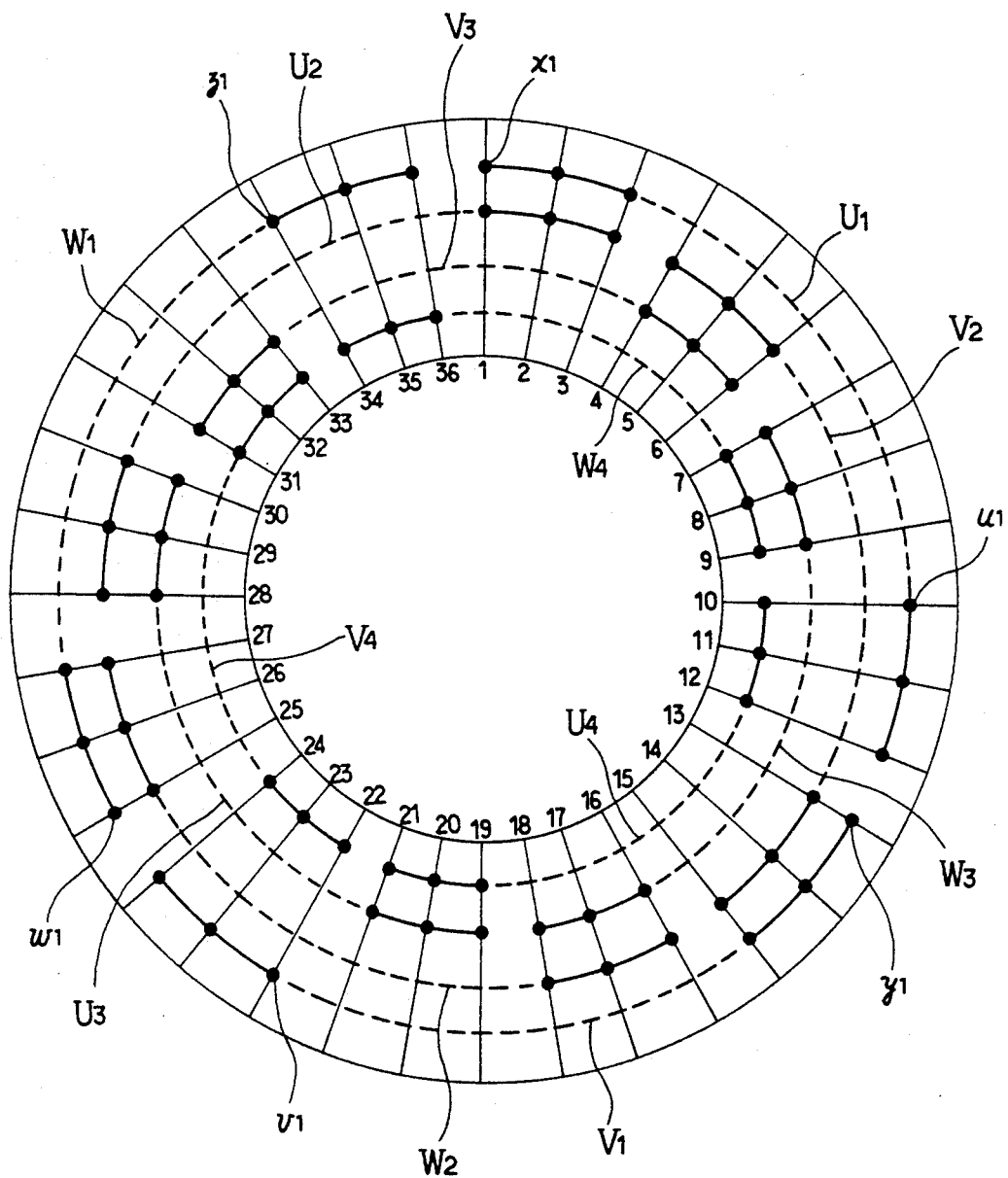
FIGS. 15, 16 and 17 are views similar to FIG. 6 illustrating eighth, ninth and tenth embodiments respectively.

FIG. 15 illustrates an eighth embodiment in which the four-pole armature winding of the concentric double-layer type laid in thirty-six slots is obtained. The eighth embodiment differs from the sixth embodiment in the coil pitch of the concentrically wound coils. The coil pitches of three concentrically wound coils composing each pole winding of each phase are 11, 9 and 7. The same pole windings in each phase are simultaneously laid as one set in the slots by the number of times corresponding to the number of poles.

Figure 16:
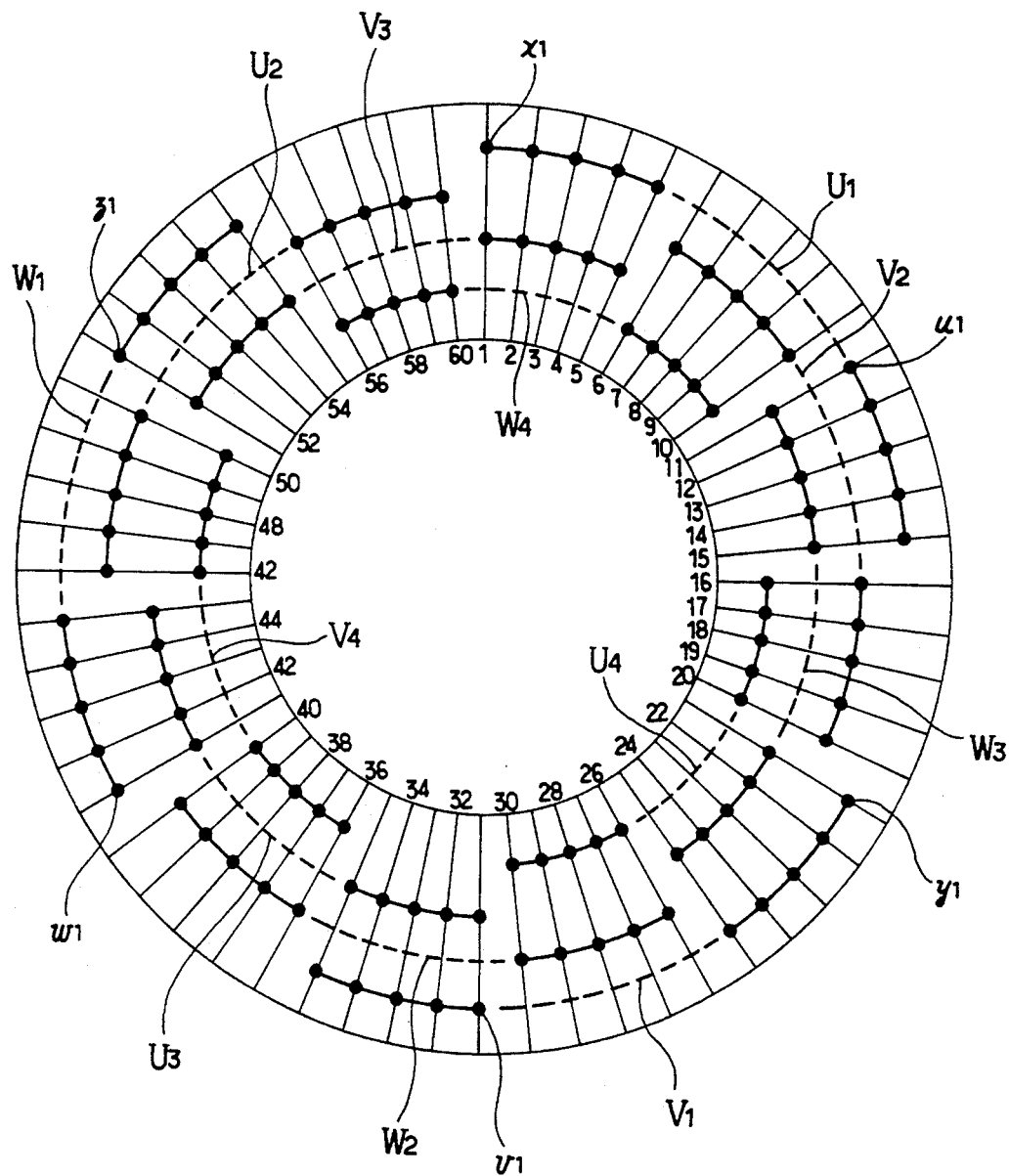

FIG. 16 illustrates a ninth embodiment in which the four-pole armature winding of the concentric double-layer type laid in sixty slots is obtained. The number q of slots of each pole in each phase is obtained as q=60/4×3=5. Each pole winding comprises five concentrically wound coils with coil pitches different from one another and the coil pitches are 14, 12, 10, 8 and 6 in turn.

The same effect can be achieved in the ninth embodiment as in each of the above-described embodiments. Particularly, the insertion of the insulators in the slots or provision of the interphase insulators can be advantageously simplified as in the fourth and eighth embodiments.

Figure 17:
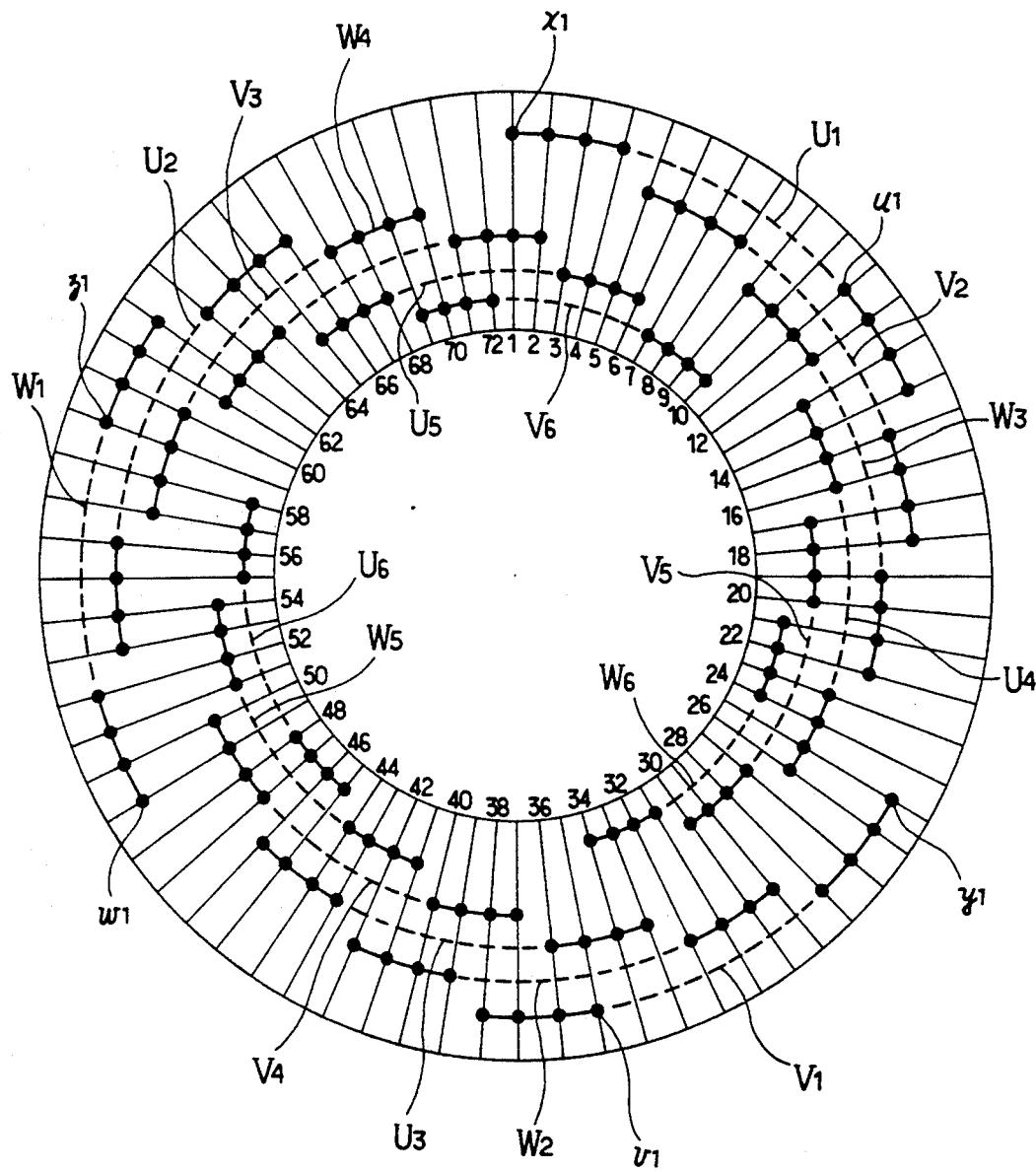
Figure 18:
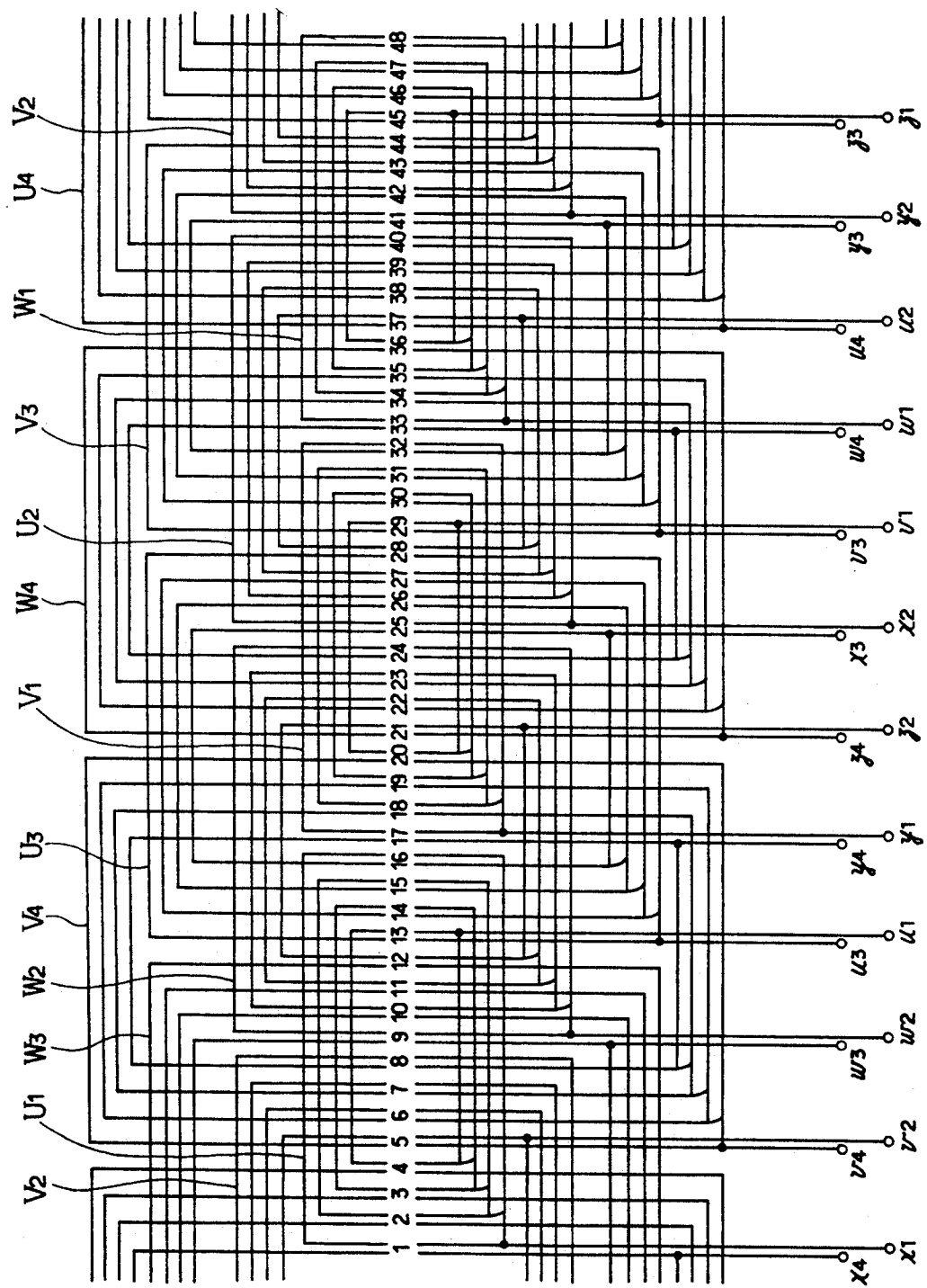
FIGS. 18 to 22 are views similar to FIGS. 5 to 9 illustrating an eleventh embodiment respectively.

FIG. 17 illustrates a tenth embodiment wherein 72 slot 6 pole winding is obtained. The number q of slots in each pole in each phase is 4, and the winding in each pole in each phase comprises four coils. The coil pitches are 13, 11, 9 and 7 in turn for the purpose of obtaining the concentric double-layer winding. When the double-layer lap winding is obtained, the pitch of all the coils is 10 and four coils composing each pole winding in each phase are sequentially positioned in adjacent slots. In each of these cases, the same effect can be obtained as in the foregoing embodiments when the same pole windings in each phase are simultaneously laid as one set into the slots by the number of times corresponding to the number of poles so that the double-layer winding is obtained.

Figure 19:
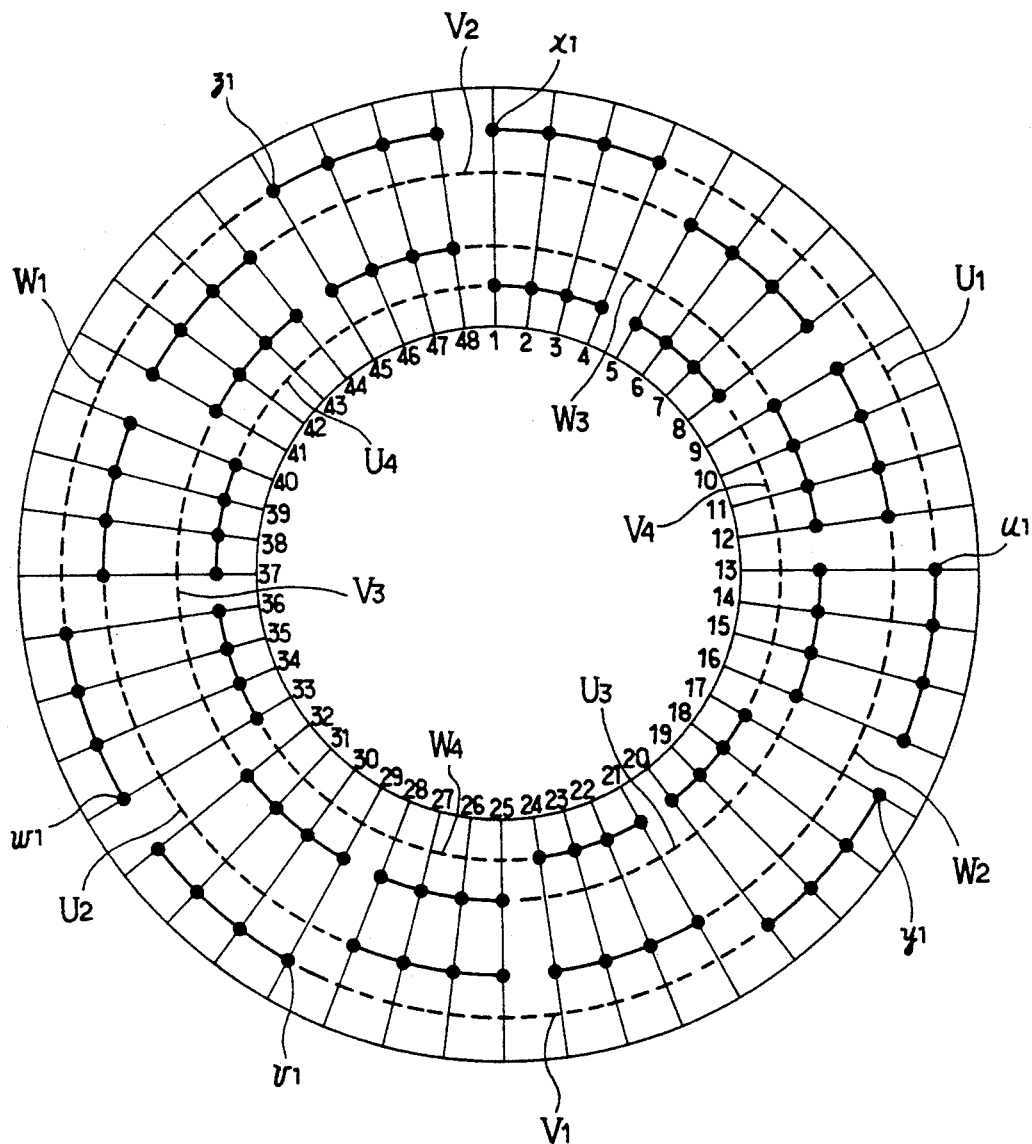
Figure 20:
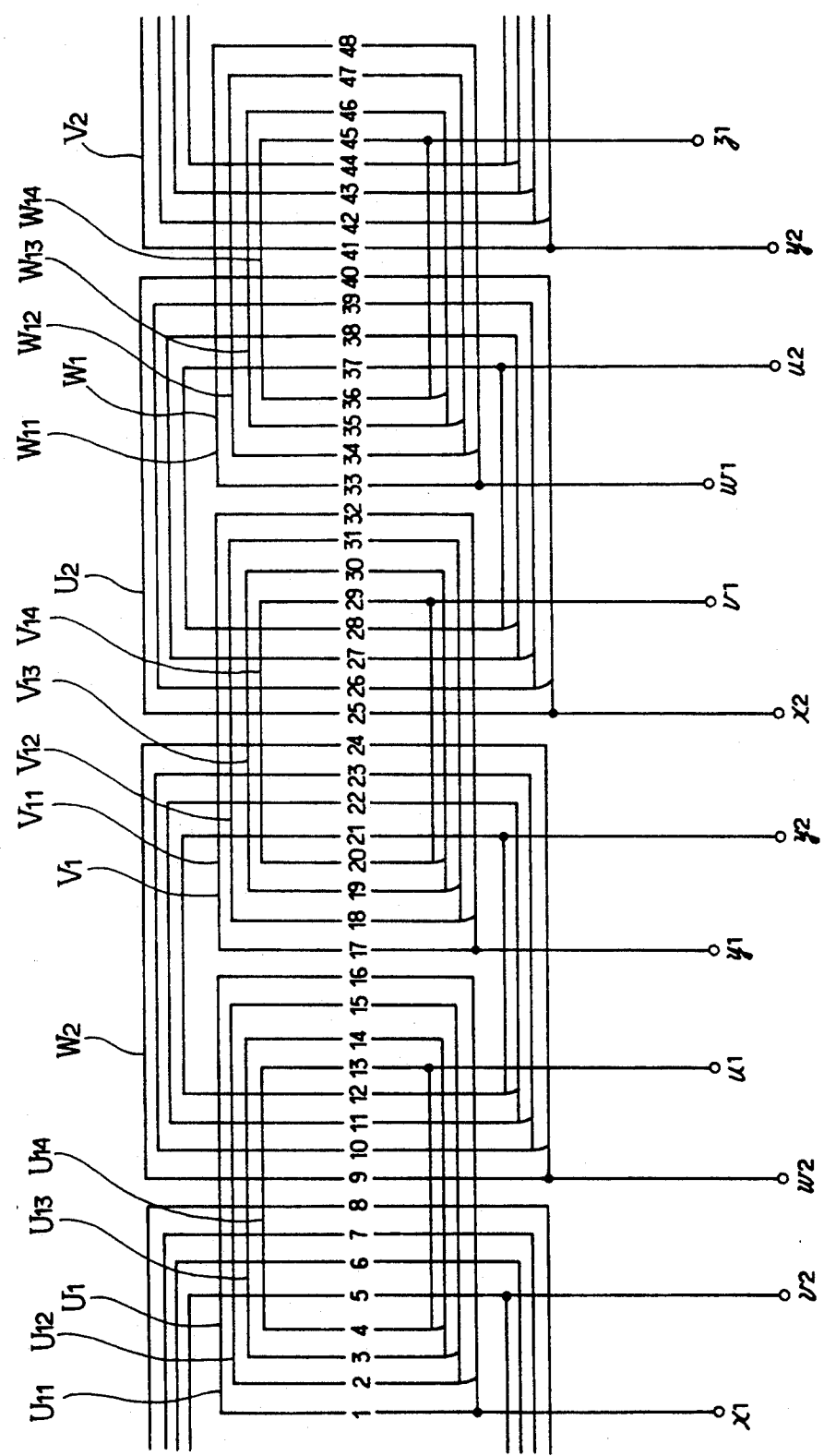

FIGS. 18 to 22 illustrate an eleventh embodiment in which the four-pole armature winding of the concentric double-layer type laid in forty-eight slots is obtained. The number q of slots in each pole in each phase is obtained as q=48/4×3=4. Each pole winding in each phase comprises four concentrically wound coils U1-1-U14, V11-V14 and W11-W14, the number of which coils is equal to the number q of slots. FIG. 20 illustrates the first and second pole windings in each phase. Each pole winding in each phase is composed based on the same principle and therefore, the first pole winding U1 in the phase U will be described in detail. The first pole winding U1 comprises four or q number of coils with different pitches from one another, the coils being a first coil U11 with the coil pitch of 15 laid in slots #1 and #16, a second coil U12 with the coil pitch of 13 laid in slots #2 and #15, a third coil U13 with the coil pitch of 11 laid in slots #3 and #14, and a fourth coil U14 with the coil pitch of 9 laid in the slots #4 and #13.

Referring then to FIG. 19, the first pole windings U1, V1, W1 of the respective phases are shifted from one another by an electrical angle of 240 degree corresponding to pπ/3. Subsequently, one coil sides of the second pole windings of the second and third phases V, W are laid in the slots positioned inside the first pole winding of the first phase U. The other pole windings are laid in the slots in the same manner as described above such that the concentric double-layer winding is obtained. The second and other pole windings of the respective phases are also shifted from one another by an electrical angle of 240 degrees corresponding to pπ/3.

TABLE 3 shows the positional relationship of the coil groups composing the respective windings.

TABLE 3

| | Coil pitch | | | |
|---|---|---|---|---|
| | 15 | 13 | 11 | 9 |
| U1 | bottom—bottom | bottom—bottom | bottom—bottom | bottom—bottom |
| U2 | bottom—bottom | bottom—bottom | bottom—bottom | bottom—bottom |
| U3 | upside—upside | upside—upside | upside—upside | upside—upside |

TABLE 3-continued

| | Coil pitch | | | |
|---|---|---|---|---|
| | 15 | 13 | 11 | 9 |
| U4 | upside—upside | upside—upside | upside—upside | upside—upside |
| V1 | bottom—bottom | bottom—bottom | bottom—bottom | bottom—bottom |
| V2 | bottom—bottom | bottom—bottom | bottom—bottom | bottom—bottom |
| V3 | upside—upside | upside—upside | upside—upside | upside—upside |
| V4 | upside—upside | upside—upside | upside—upside | upside—upside |
| W1 | bottom—bottom | bottom—bottom | bottom—bottom | bottom—bottom |
| W2 | bottom—bottom | bottom—bottom | bottom—bottom | bottom—bottom |
| W3 | upside—upside | upside—upside | bottom-upside | upside—upside |
| W4 | upside—upside | upside—upside | upside—upside | upside—upside |

Describing the order of insertion of each coil, the three-phase first pole windings U1, V1, W1 and the three-phase second pole windings U2, V2, W2 are simultaneously laid as one set in the slots by the automatic coil inserter not shown in the first coil inserting work. As obvious from TABLE 3, all the coil sides of twenty-four coils composing the one set of windings are laid in the bottom of the slots. Further, the first pole windings U1, V1, W1 and the second pole windings U2, V2, W2 are set in the automatic coil inserter so that these windings are shifted from one another by an electrical angle of 240 degrees and the first and second poles are shifted from each other by an electrical angle of 180 degrees. Consequently, no two coils are laid in the same coil and accordingly, the coils are prevented from interfering with each other when laid in the slots.

Subsequently, a second set of three-phase third pole windings U3, V3, W3 and three-phase fourth pole windings U4, V4, W4 are simultaneously laid in the slots in a second coil inserting work. All the coil sides of twenty-four coils composing these windings are laid in the upside of the slots, as obvious from TABLE 3. The three-phase third and fourth pole windings are shifted from one another by an electrical angle of 240 degrees and the third and fourth poles are shifted by an electrical angle of 180 degrees. Consequently, the coils are prevented from interfering with each other when laid into the slots.

As obvious from TABLE 3, the coil sides of the first and second pole windings are laid in the bottom of all the slots in the first inserting work. Accordingly, the third and fourth windings are merely laid on the upside of all the slots in the second inserting work.

In accordance with the above-described embodiment, all the windings can be laid in the slots by the first and second inserting works with the automatic coil inserter, the number of which inserting works is equal to the half of the number of poles. Further, as obvious from the slots #1–#4, for example, the coils of the same phase are laid in these slots, the work for disposing the insulators in the slots or interphase insulators can be simplified. FIG. 19 illustrates the arrangement of the coils laid in the slots as described above.

Figure 21:
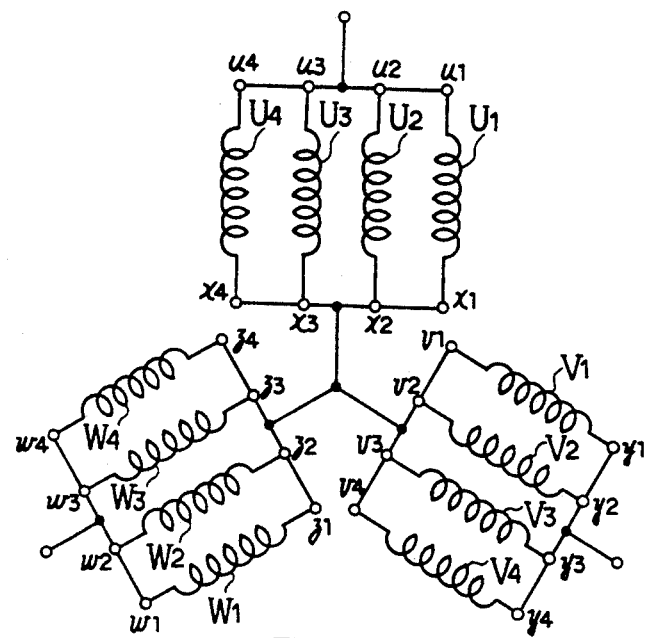
Figure 22:
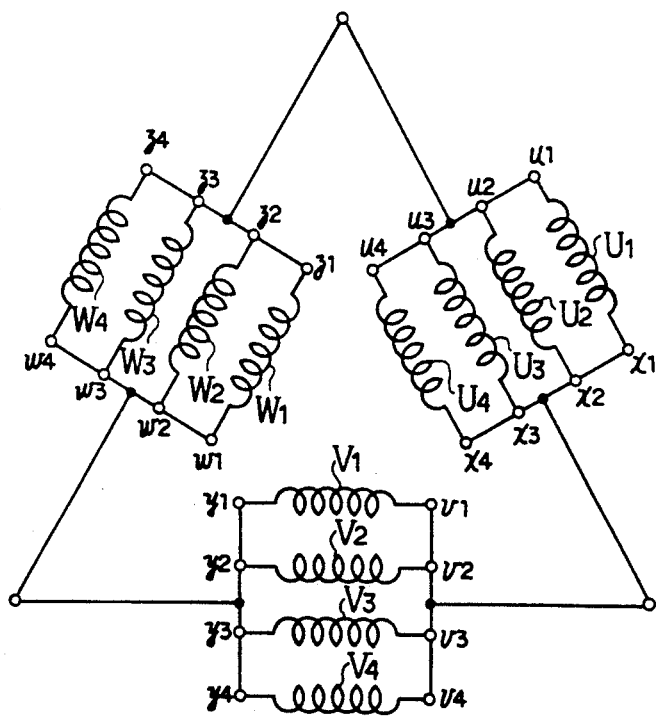

Concerning the connection of the coils, when the coils are connected as shown in FIG. 21, four-phase Y-connection circuits are obtained while four-phase delta-connection circuits are obtained when they are connected as shown in FIG. 22.

In accordance with the above-described embodiment, all the coils can be laid in the slots by two coil inserting works with the automatic coil inserter. Consequently, the productivity can be improved as compared with the conventional double-layer lap winding in which the coil insertion is manually performed.

FIGS. 23 and 24 illustrate a twelfth embodiment. Although the embodiment is directed to four-pole armature winding of the concentric double-layer type laid in forty-eight slots as in the eleventh embodiment, the pitches of the coils differ from those in the eleventh embodiment.

The number q of slots in each pole in each phase is four as in the eleventh embodiment. Each pole winding of each phase comprises four concentrically wound coils with coil pitches different from one another. The coil pitches of concentrically wound coils are 11, 9, 7 and 5. The other features are the same as in the eleventh embodiment. FIG. 24 shows the radial positions of the end windings of the pole windings laid in the slots as described above. It is obvious that the radial positions are the same among the phases and balanced geometrically and electrically. Accordingly, the same effect can be achieved in the twelfth embodiment as in the eleventh embodiment. Since the coil sides of different phases are conventionally laid in the same slots, the insulators are laid mechanically or manually in the slots for insulation between different coils.

A thirteenth embodiment will be described with reference to FIGS. 25 and 26. This embodiment is the same as the eleventh and twelfth embodiments in that the four-pole armature winding laid in forty-eight slots is obtained and that the number q of slots in each pole in each phase is four but differs from them in the lap winding.

Each pole winding in each phase comprises four series coils with the coil pitch of 12. FIG. 26 shows three-phase first pole windings U1, V1, W1 and second pole windings U2, V2, W2. Each of the series coils is disposed in each adjacent slot in turn. These two sets of three-phase pole windings are simultaneously laid in the core slots by the automatic coil inserter in the first inserting work. The other third and fourth pole windings are each composed as described above and are simultaneously laid in the slots in the second inserting work. The coil arrangement in the thirteenth embodiment is identical with that shown in FIG. 19 as the eleventh embodiment.

In accordance with the thirteenth embodiment, the automatic coil inserter can be employed in the coil inserting work in spite of the double-layer lap winding and consequently, the productivity can be improved. The shaping work for the end windings can be readily performed since the number of conductors in each coil is the half of that in the concentric single-layer winding.

FIG. 27 illustrates a fourteenth embodiment in which the four-pole armature winding laid in thirty-six slots is obtained. The number q of slots in each pole in each phase is 3 and each pole winding in each phase comprises three (q=3) concentrically wound coils with the respective coil pitches of 11, 9 and 7. The phase windings are shifted from one another by an electrical angle of 240 degrees and all the three-phase pole windings are simultaneously laid in the slots at the number of times equal to the half of the number of poles such that the concentric double-layer winding is obtained. Although the fourteenth embodiment differs from the eleventh embodiment in the number of slots and the coil pitch, the same effect can be achieved in the fourteenth embodiment as in the eleventh embodiment.

In a fifteenth embodiment, the four-pole armature winding of the double-layer type laid in thirty-six slots is obtained. The coil pitch is 9 and the percent pitch is 88.9%. The coil arrangement in this embodiment is identical with that shown in FIG. 27.

FIG. 28 illustrates, as a sixteenth embodiment, the coil arrangement of the concentric double-layer winding wherein the number of slots of the armature core is thirty-six and the number of poles is four. This embodiment differs from the fourth embodiment shown in FIG. 11 in the coil pitches of the concentrically wound coils. The coil pitches of three concentrically wound coils composing each pole winding in each phase are 8, 6 and 4 in turn. Three-phase all pole windings are simultaneously laid in the slots at the number of times equal to the half of the number of poles such that the double-layer winding is obtained.

FIG. 29 illustrates the coil arrangement of a seventeenth embodiment. The armature core has sixty slots and the number of poles are 4 in the embodiment. The number q of slots in each pole in each phase is obtained as $q=60/4\times3=5$. Each pole winding in each phase comprises five concentrically wound coils with different coil pitches which are 19, 17, 15, 13 and 11.

The same effect can be achieved in the embodiment as in the above-described embodiments and particularly, the insertion of the insulators into the slots and the provision of the interphase insulators can be simplified, as in the eleventh embodiment.

FIG. 30 illustrates the coil arrangement of a eighteenth embodiment. The armature core has sixty slots and the number of poles is four in the embodiment. The concentric double-layer winding is obtained. This embodiment differs from the seventeenth embodiment in the coil pitches of the concentrically wound coils. The coil pitches of five concentrically wound coils composing each pole winding in each phase are 14, 12 and 8 in turn. Three-phase all pole windings are also simultaneously laid in the slots at the number of times equal to the half of the number of poles such that the double-layer winding is obtained.

Figure 31:
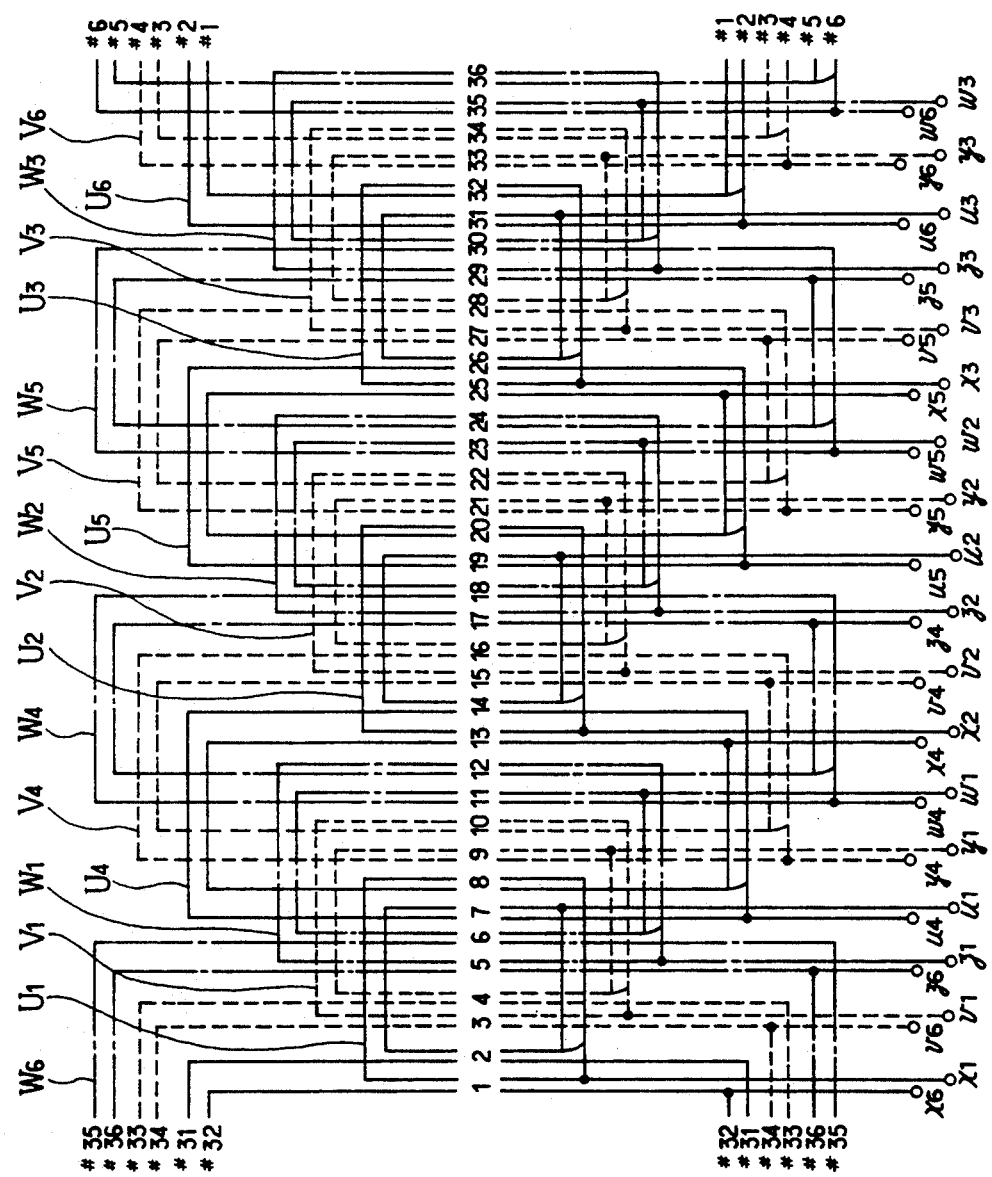
FIGS. 31 to 35 are views similar to FIGS. 5 to 9 illustrating a nineteenth embodiment respectively.
Figure 32:
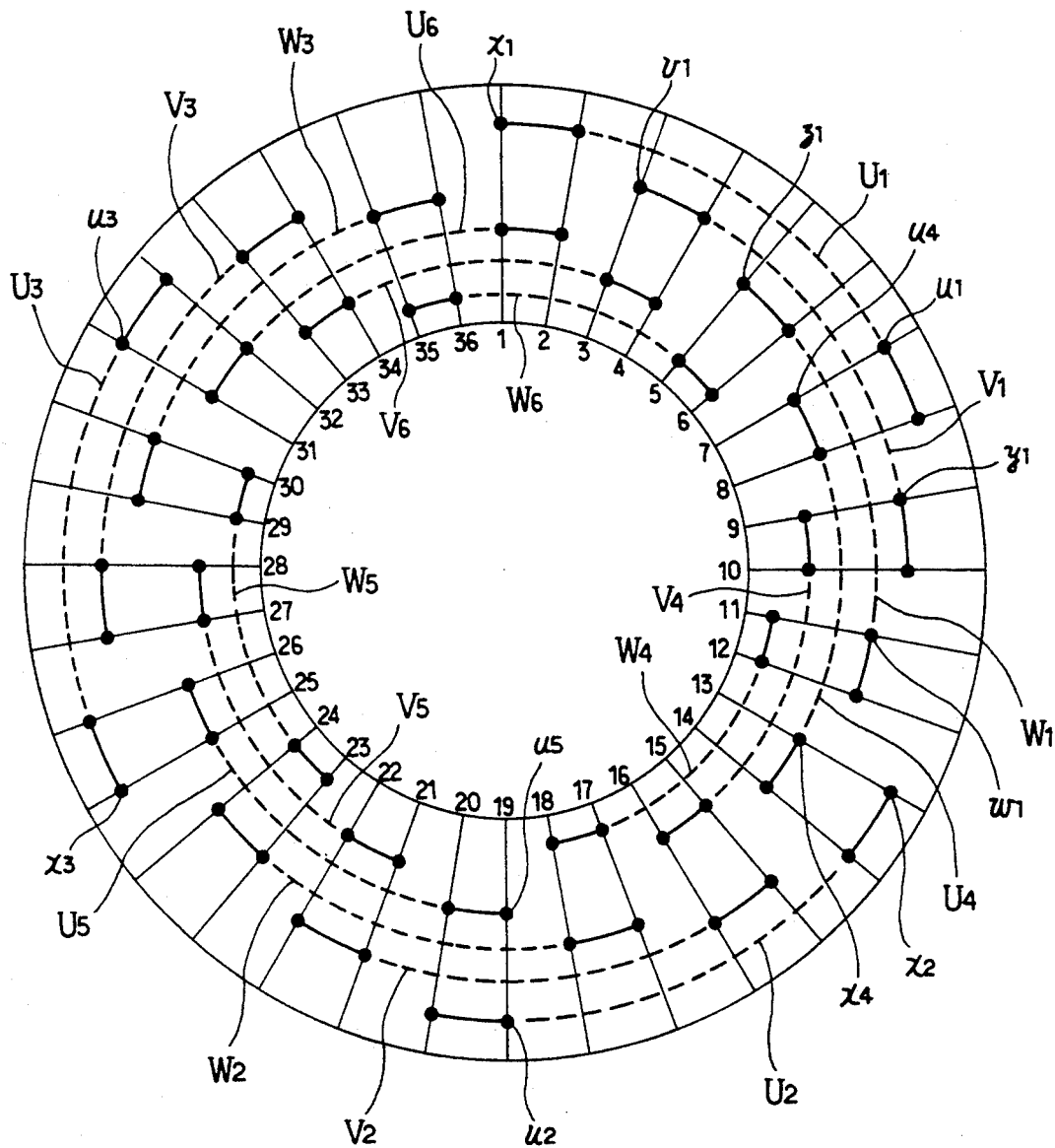
Figure 33:
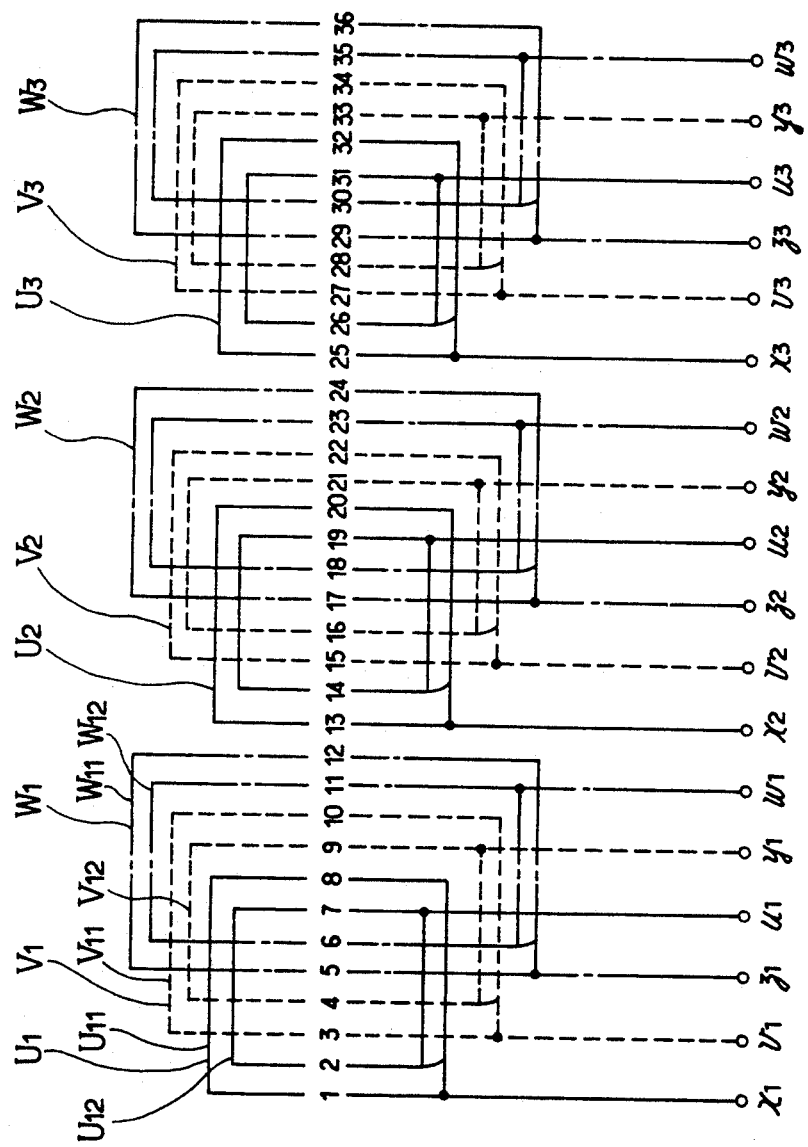
Figure 34:
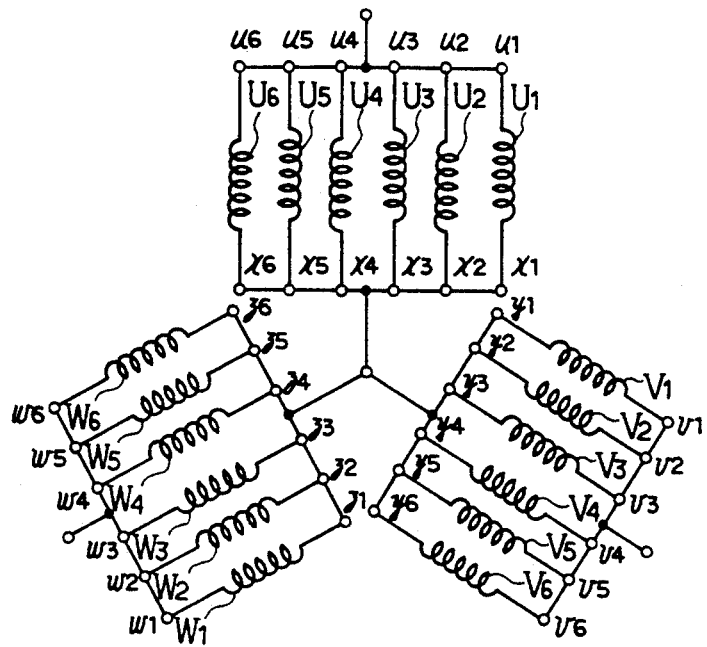
Figure 35:
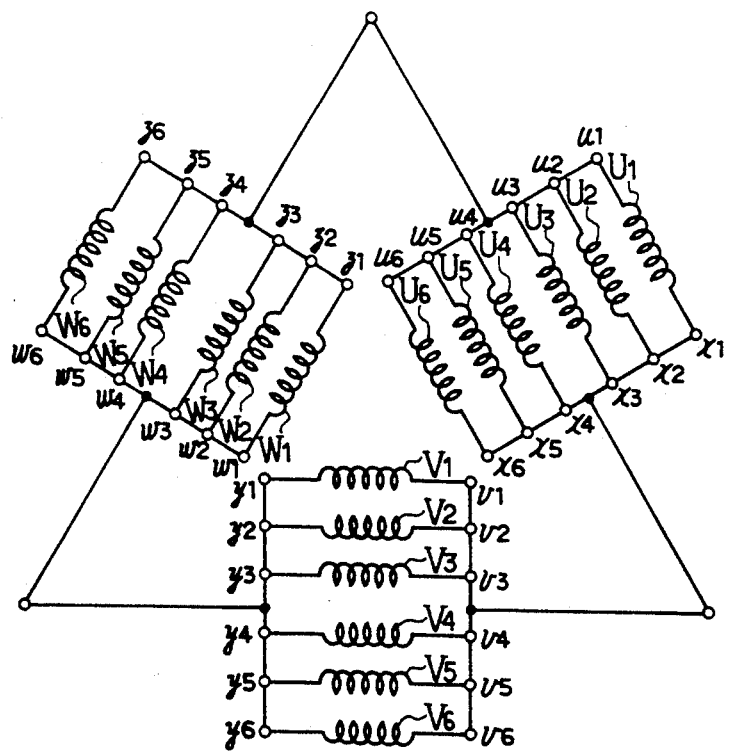

In a nineteenth embodiment, the armature core has thirty-six slots, the number of poles is six and the concentric double-layer winding is obtained as shown in FIGS. 31 to 35. Reference symbols U1 to U6 designate first to sixth pole windings in the phase U, respectively, V1 to V6 first to sixth pole windings in the phase V, respectively and W1 to W6 six pole windings in the phase W, respectively. The number q of slots in each pole in each phase is represented as $q=36/(6\times3)=2$. The pole windings in each phase comprise two concentrically wound coils U11 and U12, V11 and V12, W11 and W12, respectively, the number of which coils is equal to the number q of slots in each pole in each phase. FIG. 33 shows three-phase first to third pole windings simultaneously laid in the core slots in the first inserting work. Since the pole windings in each phase are composed on the same principle, only the first pole winding in the phase U will be described in detail. The first pole winding in the phase U comprises a first coil U11 with the coil pitch laid in slots #1 and #8, a second coil U12 with the coil pitch laid in slots #2 and #7, q number of or two coils having different coil pitches, and other q number of or two coils having different coil pitches. Three windings U1, U2, U3 not being adjacent to one another in six windings in the phase U are shifted from one another by an electrical angle of 360 degrees corresponding to the true mechanical angle of 120 degrees in order that the end windings of these coils are positioned at the outermost armature core. Further, the percent coil pitch is 100% so that one coil sides of the pole windings of the other phases V1 and W1, V2 and W2, V3 and W4 are disposed within the minimum coil pitches of the pole windings U1, U2, U3. The pole windings U1, V1, W1 in different phases are shifted from one another by an electrical angle of 60 degrees and the following pole windings are shifted in the same manner. FIG. 31 shows the layout of the above-described set of coils composing each winding. Two coil sides in the same phase are laid in each of the slots #1 to #36 such that the double-layer winding is provided. TABLE 4 shows the positional relationship of the coil groups composing the respective windings.

TABLE 4

|    | Coil pitch        |                   |
| -- | ----------------- | ----------------- |
|    | 7                 | 5                 |
| U1 | bottom—bottom     | bottom—bottom     |
| U2 | bottom—bottom     | bottom—bottom     |
| U3 | bottom—bottom     | bottom—bottom     |
| U4 | upside—upside     | upside—upside     |
| U5 | upside—upside     | upside—upside     |
| U6 | upside—upside     | upside—upside     |
| V1 | bottom—bottom     | bottom—bottom     |
| V2 | bottom—bottom     | bottom—bottom     |
| V3 | bottom—bottom     | bottom—bottom     |
| V4 | upside—upside     | upside—upside     |
| V5 | upside—upside     | upside—upside     |
| V6 | upside—upside     | upside—upside     |
| W1 | bottom—bottom     | bottom—bottom     |
| W2 | bottom—bottom     | bottom—bottom     |
| W3 | bottom—bottom     | bottom—bottom     |
| W4 | upside—upside     | upside—upside     |
| W5 | upside—upside     | upside—upside     |
| W6 | upside—upside     | upside—upside     |

Describing the order of coil insertion, the three-phase pole windings U1, U2, U3, V1, V2, V3, W1, W2, W3 to be disposed in the bottom of the slots are simultaneously laid as one set in the armature core slots by the automatic coil inserter not shown in the first insertion work. Eighteen coils composing these windings are all laid into the bottom of the slots, as obvious from TABLE 4.

Subsequently, an intermediate shaping is performed. Needless to say, the insulators are laid between the coils disposed in the upside and the bottom of the slots or engaged with the coils. The insulators disposed in the slots can be eliminated when the armature winding of the embodiment is configured into the Y-connection or delta connection and supplied with 200 V.

The second coil inserting work is then performed. A second set of the three-phase pole windings U4, U5, U6, V4, V5, V6, W4, W5 and W6 are laid in the upside of the slots by the automatic coil inserter. The three-phase pole windings U1-U3, V1-V3 and W1-W3 are shifted by an electrical angle of 180 degrees from the three-phase pole windings U4-U6, V4-V6 and W4-W6. Each of the three-phase pole windings U1-U6, V1-V6 and W1-W6 is shifted from one another by an electrical angle of 60 degrees. Consequently, the interference between the coils can be prevented when the coils are set in the automatic coil inserter and after the coils are laid in the slots. As obvious from TABLE 4, the coil sides of the pole windings U1-U3, V1-V3 and W1-W3 are laid in the bottom of all the slots in the first inserting work. Accordingly, the pole windings U4-U6, V4-V6 and W4-W6 are merely placed on the upside of all the slots in the second inserting work.

In accordance with the above-described embodiment, all the windings are laid in the slots by the two inserting works by means of the automatic coil inserter even in the six-pole armature winding. Consequently, the productivity can be improved as compared with the conventional double-layer lap winding wherein the coil insertion is relied upon the manual work. Since the three-phase coils are sequentially laid in the adjacent slots, the insertion resistance can be reduced. FIG. 32 shows the arrangement of the coils laid in the slots in the manner as described above.

FIGS. 36 and 37 illustrate a twentieth embodiment. The armature core has thirty-six slots, the number of poles is six and the concentric double-layer winding is obtained as in the nineteenth embodiment. The coil pitches of the coils differs from those in the previous embodiment. The number of slots in each pole in each phase is two and each pole winding in each phase comprises two concentrically wound coils with coil pitches different from each other. The coil pitches of the concentrically wound coils are 6 and 4. The other arrangement is identical with that in the nineteenth embodiment. The coil arrangement is shown in FIG. 37.

Since a part of the pole windings U1, U2, U3 and a part of the pole windings W1, W2, W3 are laid in the same slots, the coil insertion is completed by three inserting works. More specifically, the pole windings U1, U2, U3, V1, V2 and V3 are laid as the first set in the slots. Then, the pole windings W1, W2, W3, U4, U5 and U6 are laid as the second set in the slots and last, the pole windings V4, V5, V6, W4, W5 and W6 are laid as the third set in the slots. Since the coil pitches are 6 and 4, the harmonic distortion can be reduced, which improves the motor characteristics. Further, the same effect can be achieved in the embodiment as in the nineteenth embodiment.

FIGS. 38 and 39 illustrate a twenty-first embodiment. The armature core has thirty-six slots and the number of poles is six. The number of slots in each pole in each phase is two as in the nineteenth and twentieth embodiments. However, the armature winding of this embodiment is formed into the lap winding.

Each pole winding in each phase comprises two series coils with the coil pitch of 6. FIG. 39 shows the arrangement of the three-phase pole windings U1, U2, U3, V1, V2, V3, W1, W2 and W3 which are simultaneously laid as the first set of windings in the bottom of the slots. The series coils are adapted to be laid in the adjacent slots in turn. The first set of windings are simultaneously laid in the bottom of the core slots by the automatic coil inserter. The other three-phase pole windings U4, U5, U6, V4, V5, V6, W4, W5 and W6 are also configured as described above and simultaneously laid in the upside of the slots. Accordingly, the coil insertion is completed by two inserting works. The coil arrangement is identical with that shown in FIG. 32 as the nineteenth embodiment.

In accordance with the twenty-first embodiment, the coil insertion can be performed by the automatic coil inserter though the armature winding is formed into the double-layer lap winding, which improves the productivity. Since the number of conductors of each coil is the half of that of the single-layer concentric winding, shaping the end windings can be readily performed.

Figure 40:
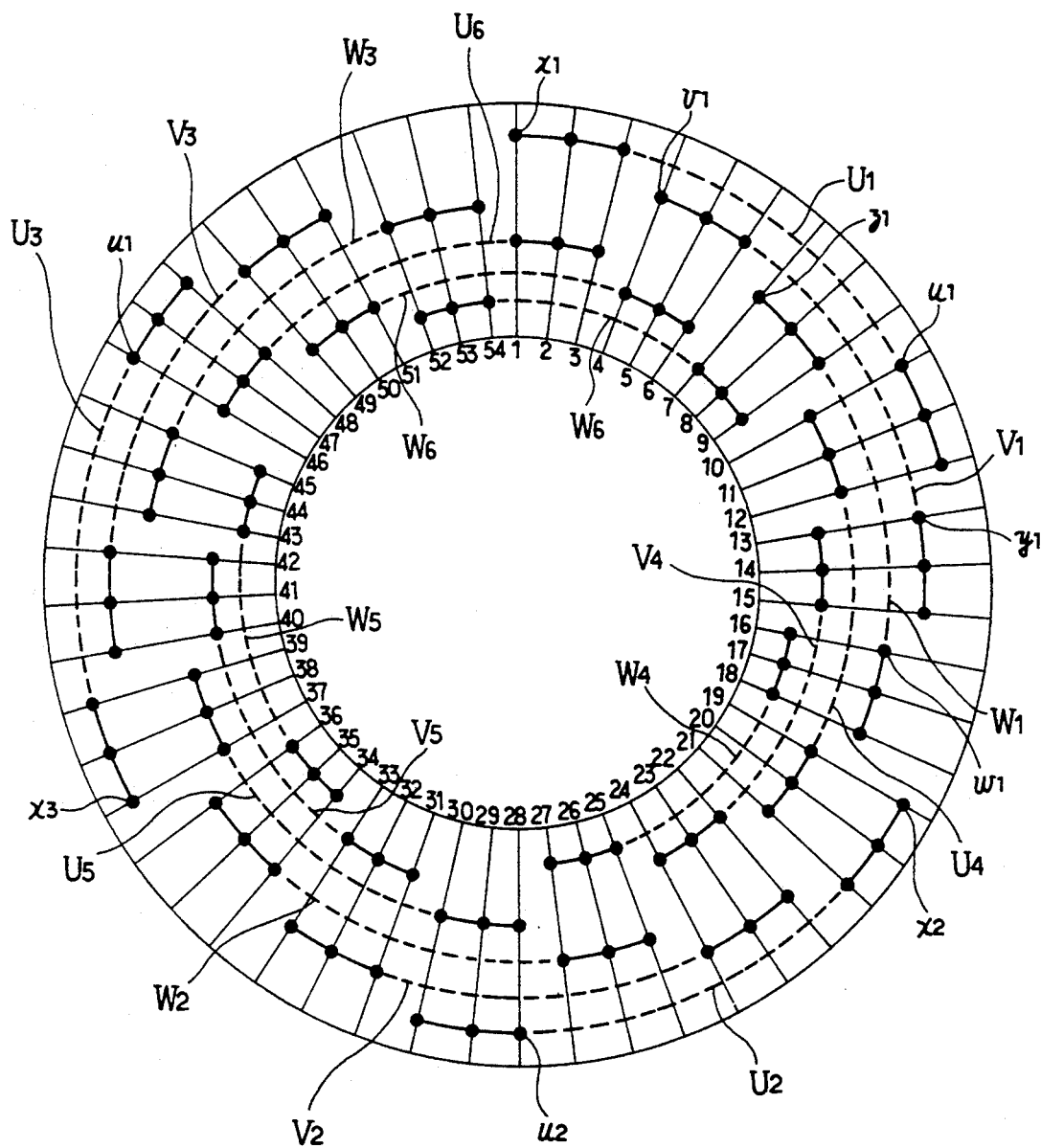
FIG. 40 is a view similar to FIG. 6 illustrating twenty-second and twenty-third embodiment.

FIG. 40 illustrates a twenty-second embodiment. The armature core has fifty-four slots and the number of poles is six. The number q of slots in each pole in each phase is three. Each pole winding in each phase comprises three concentrically wound coils with the coil pitches of 11, 9 and 7 respectively. The three-phase pole windings U1, U2, U3, V1, V2, V3, W1, W2 and W3 are simultaneously laid as the first set in the core slots and the other three-phase pole windings are simultaneously laid as the second set in the core slots such that the armature winding is formed into the concentric double-layer winding. Since this embodiment differs from the nineteenth embodiment only in the number of slots and the coil pitches, the same effect can also be achieved in the embodiment as in the nineteenth embodiment.

In a twenty-third embodiment, the armature winding can be formed into the double-layer lap winding in the arrangement that the armature core has fifty-four slots and the number of poles is six. The coil pitch is 9 and the percent pitch is 100%. The coil arrangement is identical with that shown in FIG. 40. The coil insertion is completed by two inserting works even though the armature winding is of the double-layer lap type.

FIG. 41 illustrates a twenty-fourth embodiment. The armature core also has fifty-four slots and the number of poles is six. The armature winding is formed into the concentric double-layer winding. This embodiment differs from the twenty-second embodiment in the coil pitches of the concentrically wound coils. That is, the coil pitches of three coils composing each pole winding in each phase are 10, 8 and 6 respectively. The three-phase pole windings U1-U3, and V1-V3 are simultaneously laid as the first set in the core slots and then, the second set of the windings W1-W3 and U4-U6 and the third set of the windings V4-V6 and W4-W6 are sequentially laid in the core slots. Thus, all the coils are laid in all the slots by three times of the inserting work such that the armature winding is formed into the concentric double-layer winding.

FIG. 42 illustrates a twenty-fifth embodiment. The armature core has seventy-two slots and the number of poles is six. The armature winding is formed into the concentric double-layer winding. The number q of slots in each pole in each phase is represented as $q=72/(6\times 3)=4$. Each pole winding in each phase comprises four concentrically wound coils with the coil pitches of 15, 13, 11 and 9 respectively.

The same effect can be achieved in the embodiment as in the previous embodiments. Further, insertion of the insulators into the slots and insertion of the interphase insulators can advantageously be simplified or eliminated.

Further, when the armature winding in this embodiment is formed into the double-layer lap winding, the coil pitch of all the coils is set to 12 and four coils composing each pole winding in each phase are disposed in the adjacent slots in turn. In each of the concentric double-layer and double-layer lap types, three-phase pole windings U1, U2, U3, V1, V2, V3, W1, W2 and W3 are simultaneously laid as the first set in the slots and then, the other pole windings are simultaneously laid as the second set in the slots. Thus, the coil insertion is completed by two inserting works. The same effect can be achieved in the embodiment as in the previous embodiments.

FIG. 43 illustrates a twenty-sixth embodiment. The armature core has seventy-two slots and the number of poles is six. The number q of slots in each pole in each phase is 4. When the armature winding is formed into the concentric double-layer winding, the coil pitches of the coils composing each pole winding in each phase are set to 13, 11, 9 and 7 respectively. Further, when the armature winding is formed into the double-layer lap winding, the coil pitch of all the coils is set to 10 and four coils composing each pole winding in each phase are disposed in the adjacent slots in turn. In either case, the two-phase pole windings U1, U2, U3, V1, V2 and V3 are simultaneously laid as the first set in the slots and then, another two-phase pole windings W1, W2, W3, U4, U5 and U6 are simultaneously laid as the second set in the slots. Then, the other two-phase pole windings V4, V5, V6, W4, W5 and W6 are simultaneously laid as the third set in the slots. Thus, the coil insertion is completed by three times of the inserting work such that either the double-layer lap winding or the concentric double-layer winding is obtained. The same effect can be achieved in the embodiment as in the previous embodiments.

The foregoing disclosure and drawings are merely illustrative of the principles of the present invention and are not to be interpreted in a limiting sense. The only limitation is to be determined from the scope of the appended claims.

We claim:

1. A three phase armature winding having at least four poles wherein each pole winding in each phase comprises a plurality of coils laid in armature core slots so that the armature winding is formed into a concentric multi-layer arrangement, comprising: three first pole windings corresponding to respective phases dispersively arranged in first divided regions obtained by dividing a circumstance of the armature into three equally divided regions; and three second pole windings of respective phases dispersively arranged in second divided regions obtained by dividing the core slots into three equally divided regions, the second divided regions following the first divided regions, and the first and second divided regions being circumferentially shifted from each other by an electrical angle of 60 degrees respectively.

* * * * *